United States Patent
Cheng et al.

(10) Patent No.: US 11,231,921 B2
(45) Date of Patent: Jan. 25, 2022

(54) SOFTWARE APPLICATION UPDATE MANAGEMENT ENGINE

(71) Applicants: Atlassian PTY Ltd., Sydney (AU); Atlassian Inc., San Francisco, CA (US)

(72) Inventors: Jerry Cheng, Mountain View, CA (US); Alexander James Decker, Stanford, CA (US); Bharath Booshan Lakshmi Narayanan, Santa Clara, CA (US); Shuai Li, Sunnyvale, CA (US); Nikita Leonov, San Jose, CA (US); Rene Soberanes Cacheaux, Austin, TX (US); Markus te Grotenhuis, San Francisco, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 106 days.

(21) Appl. No.: 16/271,228

(22) Filed: Feb. 8, 2019

(65) Prior Publication Data
US 2020/0257522 A1 Aug. 13, 2020

(51) Int. Cl.
*G06F 8/71* (2018.01)
*G06F 8/65* (2018.01)

(52) U.S. Cl.
CPC . *G06F 8/71* (2013.01); *G06F 8/65* (2013.01)

(58) Field of Classification Search
CPC .................................... G06F 8/65; G06F 8/71
See application file for complete search history.

(56) References Cited

U.S. PATENT DOCUMENTS

| | | | |
|---|---|---|---|
| 6,622,302 B1* | 9/2003 | Delaney | G06F 8/65 717/168 |
| 9,098,373 B2* | 8/2015 | du Toit | H04L 67/1097 |
| 2004/0093597 A1* | 5/2004 | Rao | G06F 8/65 717/171 |
| 2005/0071839 A1* | 3/2005 | Kim | G06F 8/65 717/170 |
| 2005/0246701 A1* | 11/2005 | Kanapathipillai | G06F 11/1433 717/168 |
| 2007/0113291 A1* | 5/2007 | Dai | G06F 21/629 726/27 |

(Continued)

*Primary Examiner* — Wei Y Zhen
*Assistant Examiner* — Amir Soltanzadeh
(74) *Attorney, Agent, or Firm* — Alston & Bird LLP

(57) ABSTRACT

Method, apparatus and computer program product for software application update management. For example, the apparatus includes at least one processor and at least one non-transitory memory including program code. The at least one non-transitory memory and the program code are configured to, with the at least one processor, receive a qualified lifecycle command associated with a software application; in response to receiving the qualified lifecycle command, obtain an update queue flag value for the software application; determine if the update queue flag value indicates an update-queued status or an update check status; and in response to determining that the update queue flag value indicates the update check status, determine if the software application has access to a latest version of a data resource associated with the software application and adjust the first update queue flag value based on if the software application has access to the latest version.

20 Claims, 15 Drawing Sheets

(56) References Cited

U.S. PATENT DOCUMENTS

| | | | |
|---|---|---|---|
| 2010/0082932 A1* | 4/2010 | Rothman | G06F 9/44505 711/166 |
| 2012/0210312 A1* | 8/2012 | Ma | G06F 11/1433 717/170 |
| 2013/0074061 A1* | 3/2013 | Averbuch | G06F 8/654 717/171 |
| 2016/0253165 A1* | 9/2016 | Tsuchiya | G06F 11/1464 717/168 |

* cited by examiner

SOFTWARE APPLICATION UPDATE MANAGEMENT ENGINE

BACKGROUND

Applicant has identified many deficiencies and problems associated with existing methods, apparatus, and systems related to software application update management. Through applied effort, ingenuity, and innovation, many of these identified deficiencies and problems have been solved by developing solutions that are in accordance with embodiments of the present disclosure, many examples of which are described in detail herein.

BRIEF SUMMARY

In general, embodiments of the present invention provide methods, apparatus, systems, devices, and/or the like for software application update management by using at least one of update isolation, update queuing, lifecycle-based update management, operating system command filtering, and coordinated multi-application update management.

In accordance with one aspect, an apparatus is provided. The apparatus comprises at least one processor and at least one non-transitory memory comprising program code. The at least one non-transitory memory and the program code are configured to, with the at least one processor, cause the apparatus to at least receive, by the update engine software application and from the operating system software application, a first qualified lifecycle command associated with the first software application; in response to receiving the first qualified lifecycle command from the operating system, obtain, by the update engine, a first update queue flag value associated with the first software application; determine, by the update engine, if the first update queue flag value indicates an update-queued status for the software application or an update check status for the software application; and in response to determining that the first update queue flag value indicates the update check status for the first software application, perform, by the update engine, a first set of update engine operations comprising: identify a first latest version of a first data resource associated with the first software application; determine if the first software application has access to the first latest version; and adjust the first update queue flag value based on if the first software application has access to the first latest version.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention. It will be appreciated that the scope of the invention encompasses many potential embodiments in addition to those here summarized, some of which will be further described below.

BRIEF DESCRIPTION OF THE DRAWINGS

Figure 1:
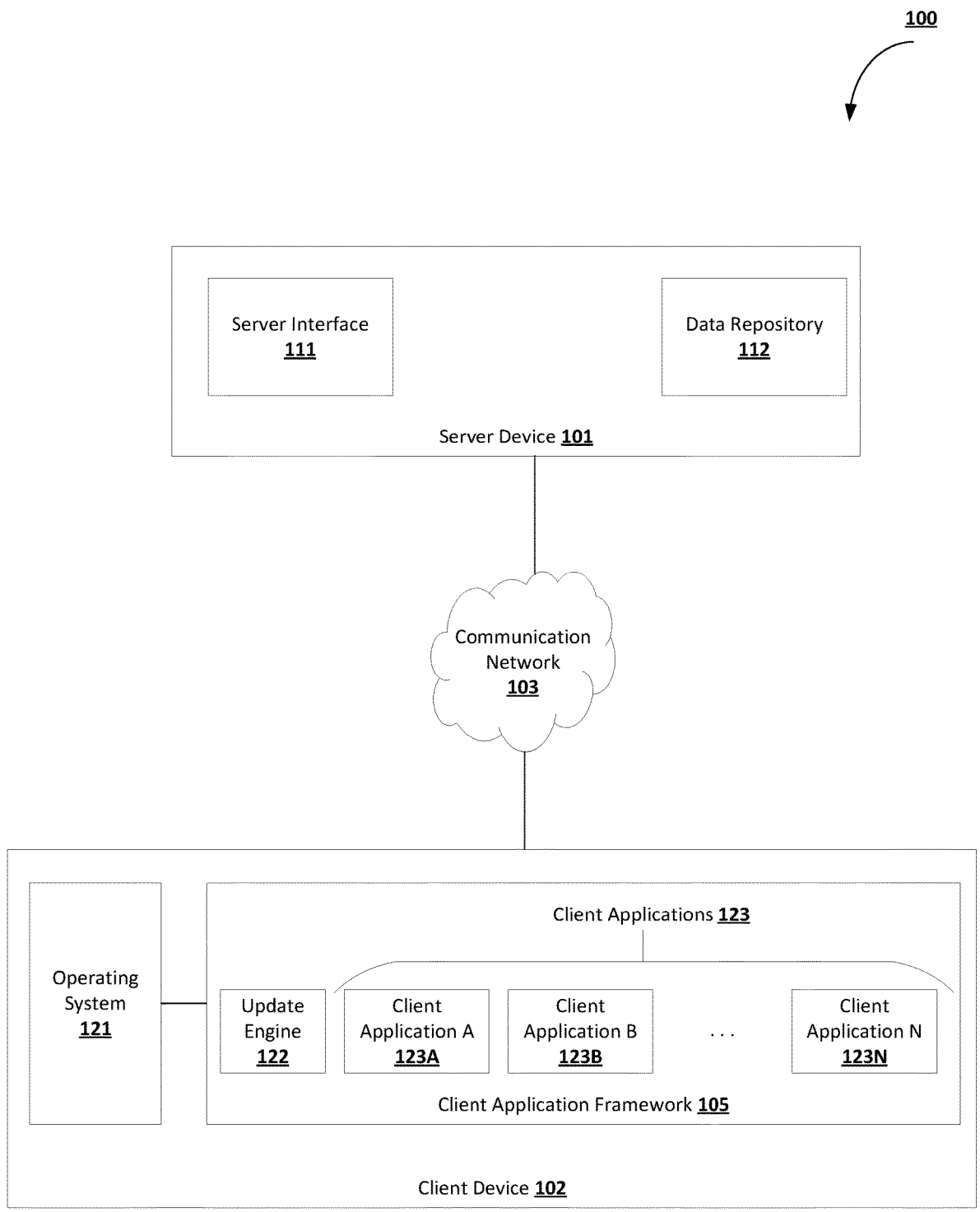

Having thus described some embodiments in general terms, references will now be made to the accompanying drawings, which are not necessarily drawn to scale, and wherein:

FIG. 1 is an example system architecture within which embodiments of the present invention may operate.

Figure 2A:
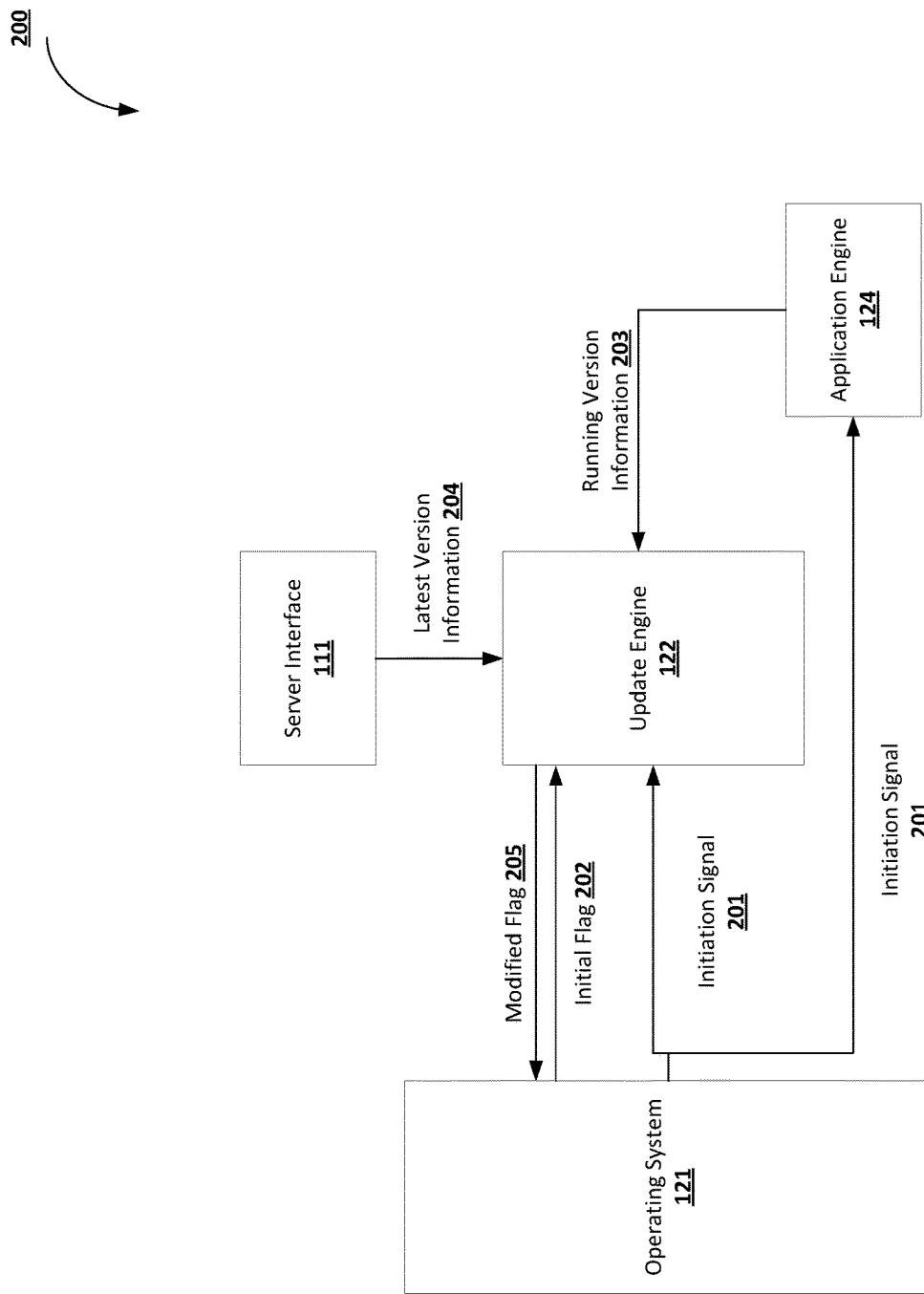
Figure 2B:
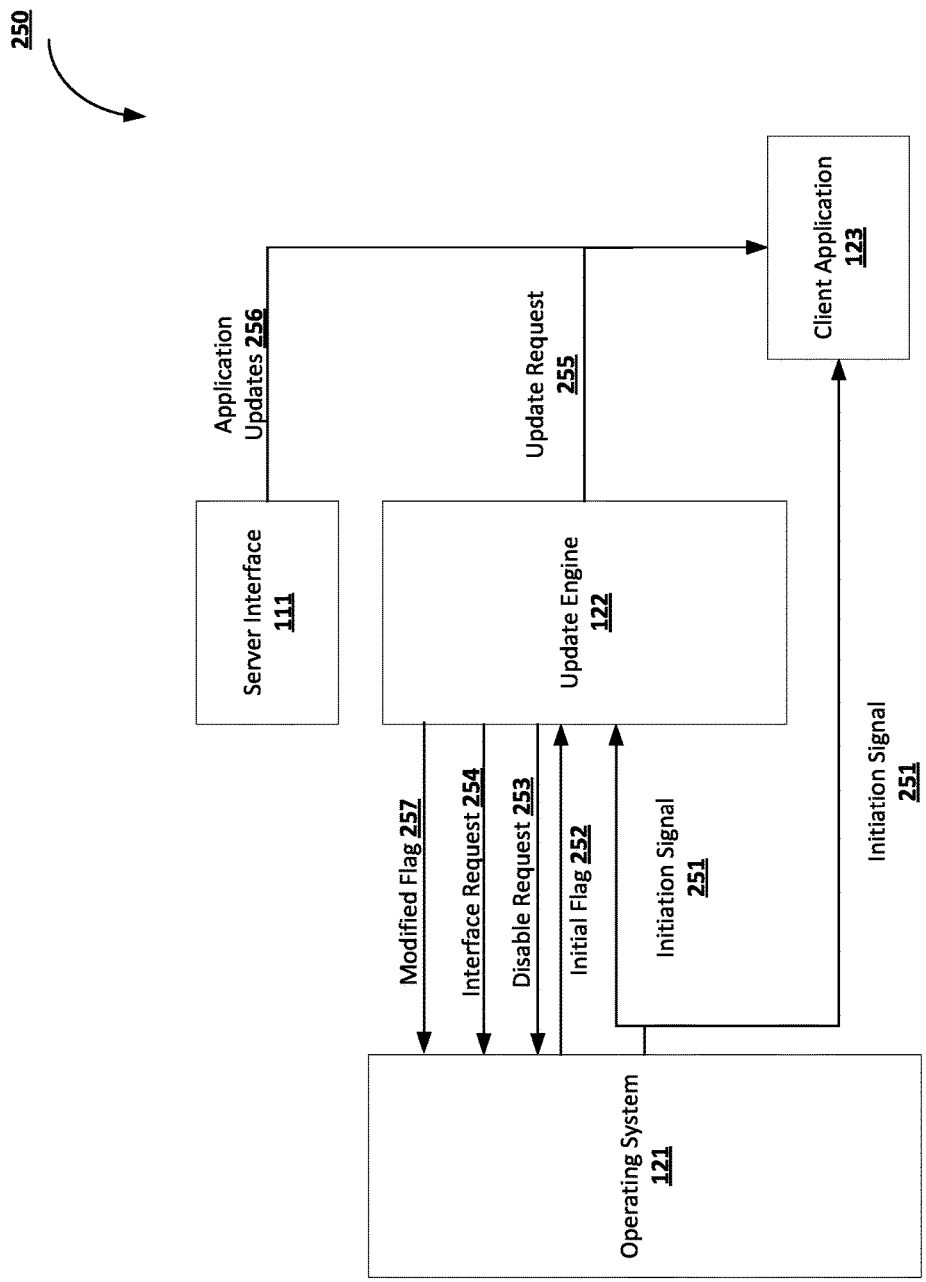

FIGS. 2A-2B are data flow diagrams for example processes for launching a client application on an interceptive device in accordance with one embodiment of the present invention.

Figure 3:
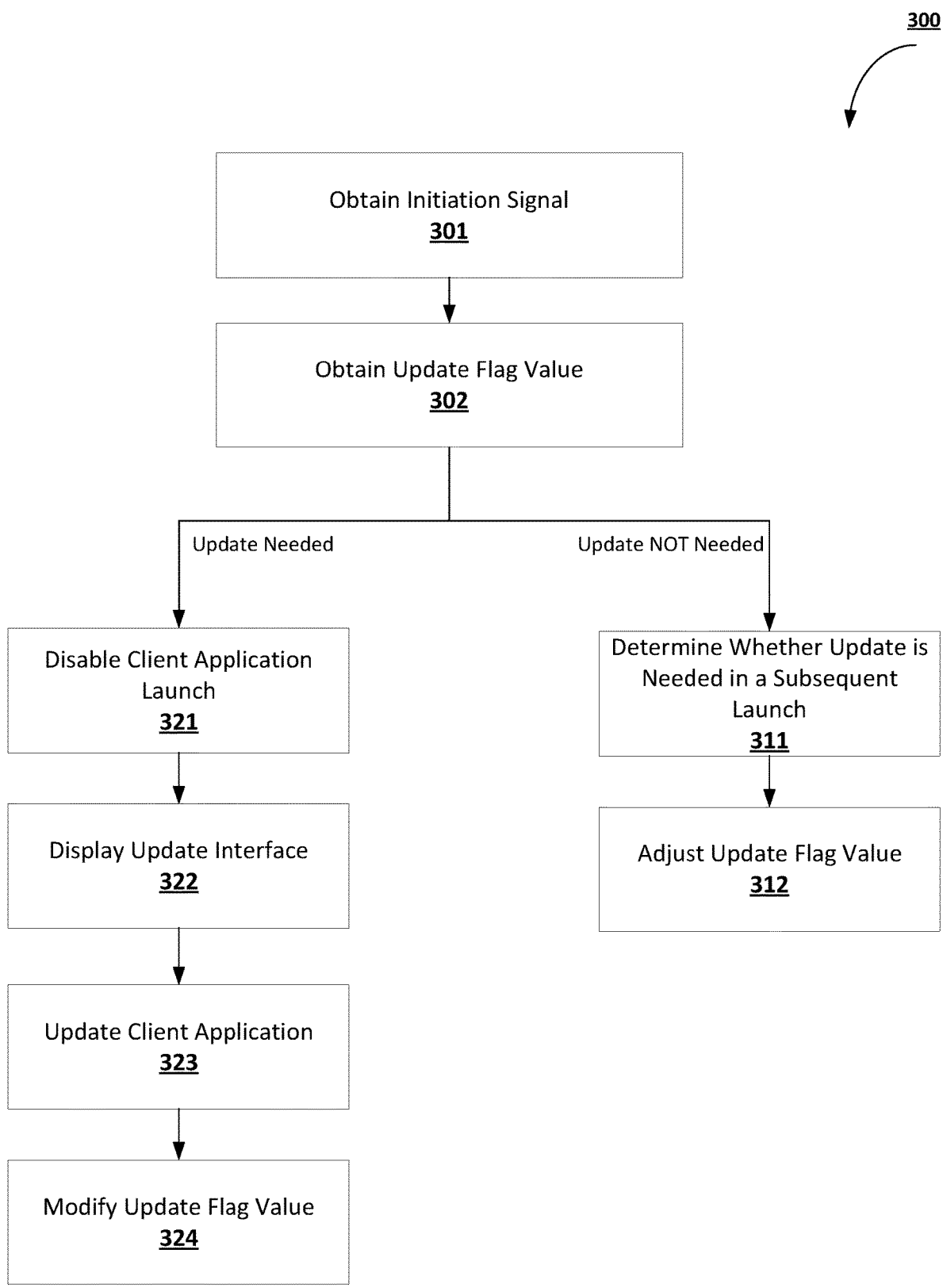

FIG. 3 is a flowchart diagram for an example process for performing update management on an interceptive device in accordance with one embodiment of the present invention.

Figure 4A:
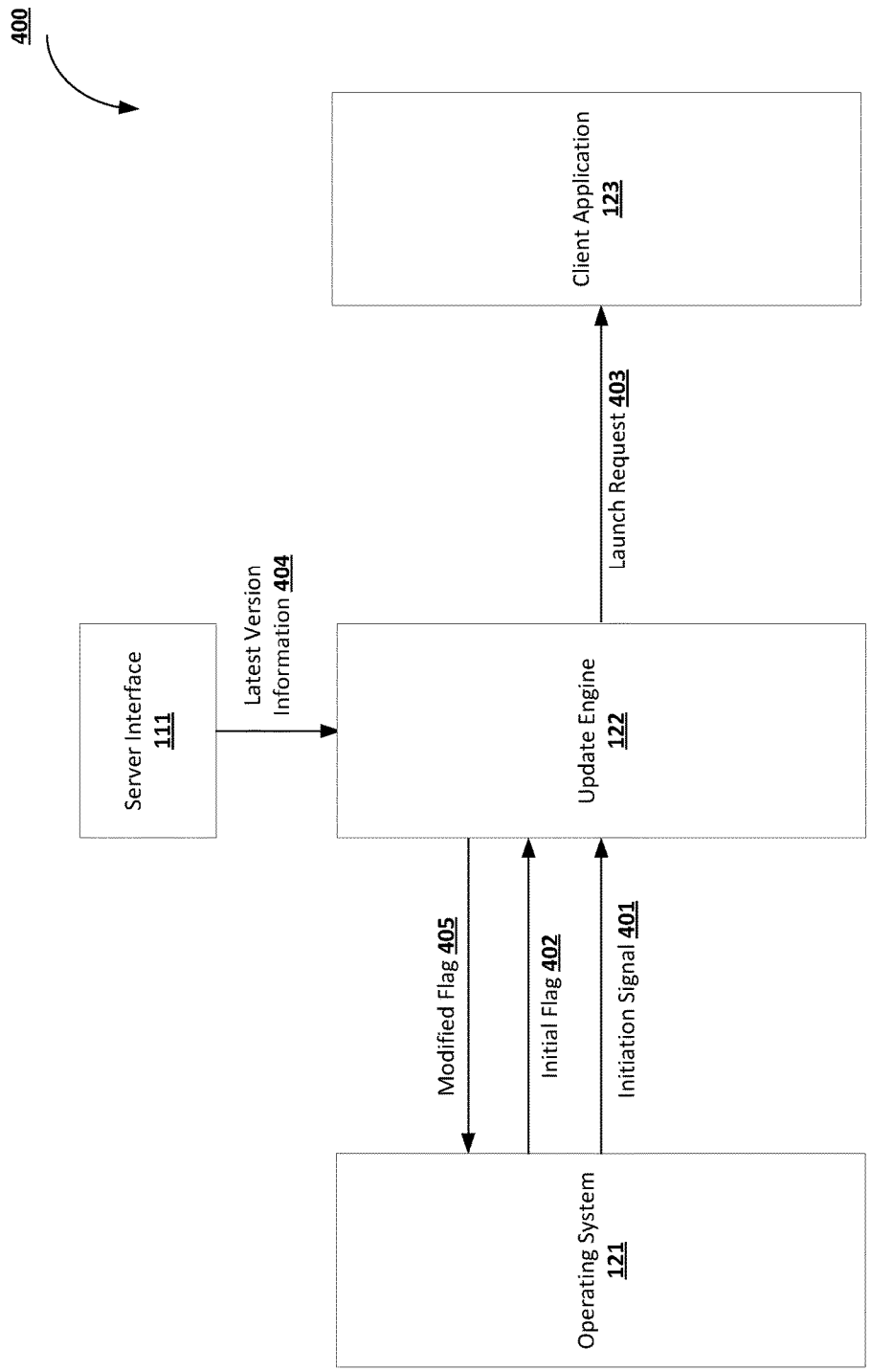
Figure 4B:
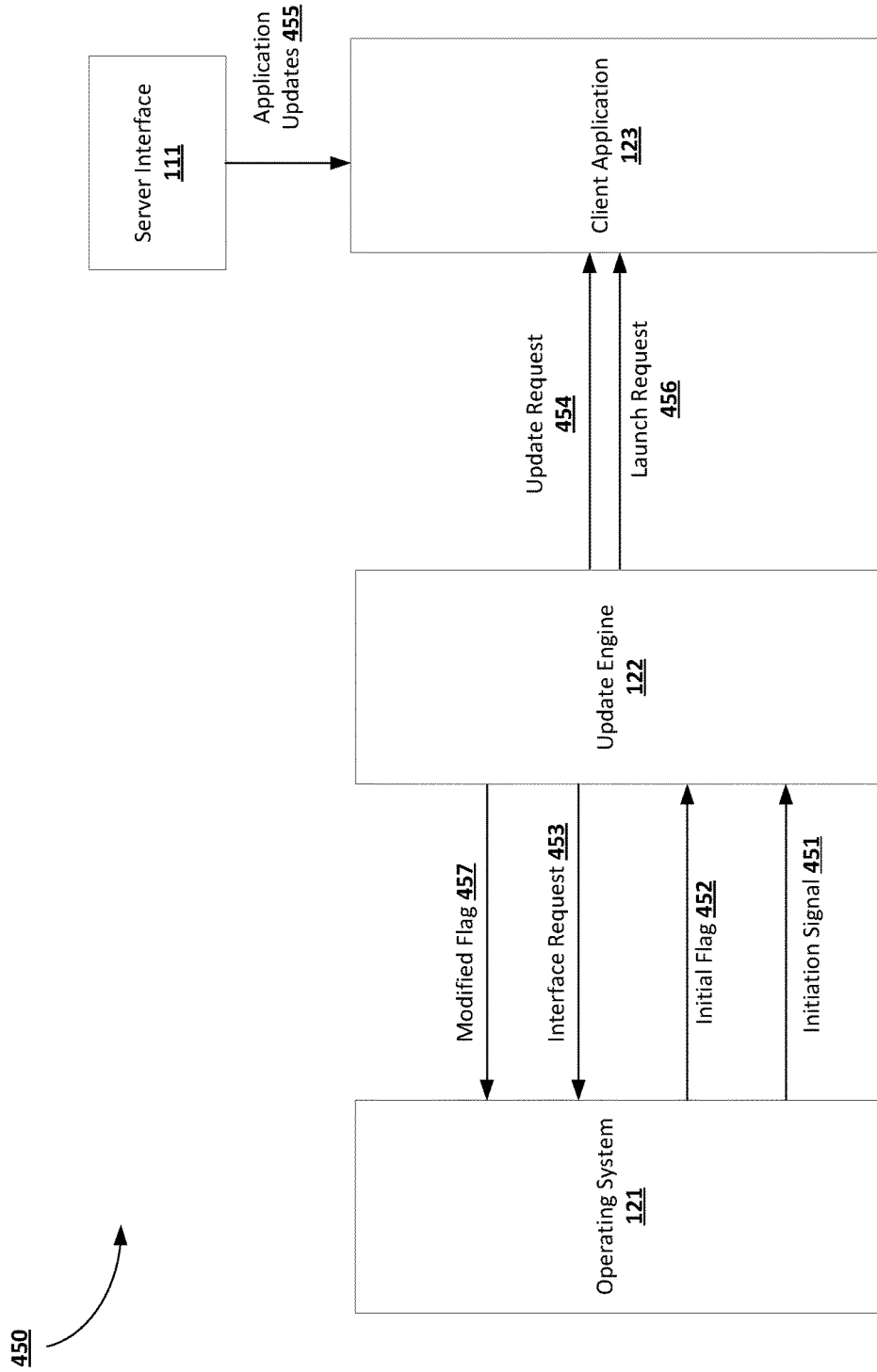

FIGS. 4A-4B are data flow diagrams for example processes for launching a client application on a non-interceptive device in accordance with one embodiment of the present invention.

Figure 5:
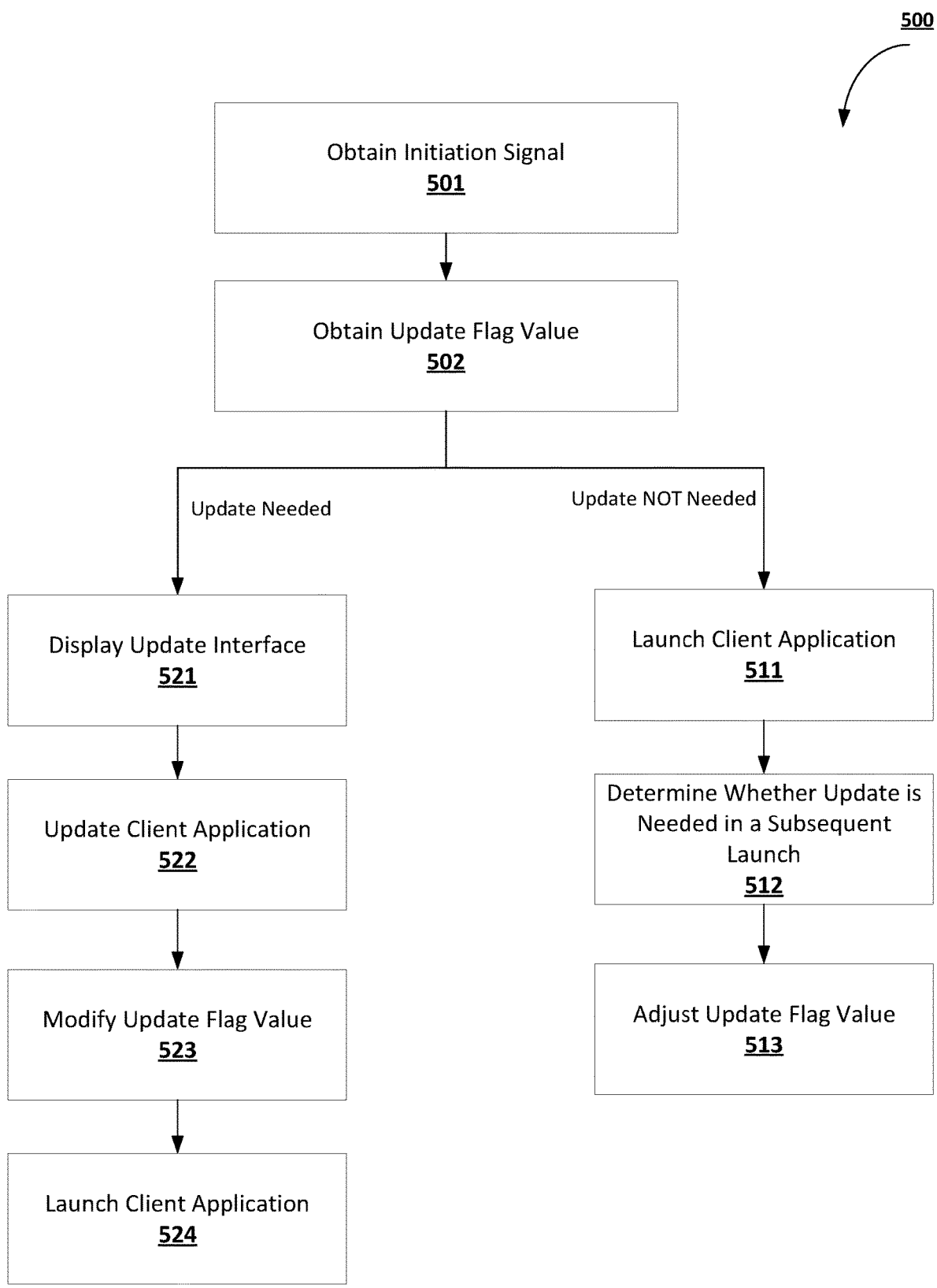

FIG. 5 is a flowchart diagram for an example process for performing update management on a non-interceptive device in accordance with one embodiment of the present invention.

Figure 6:
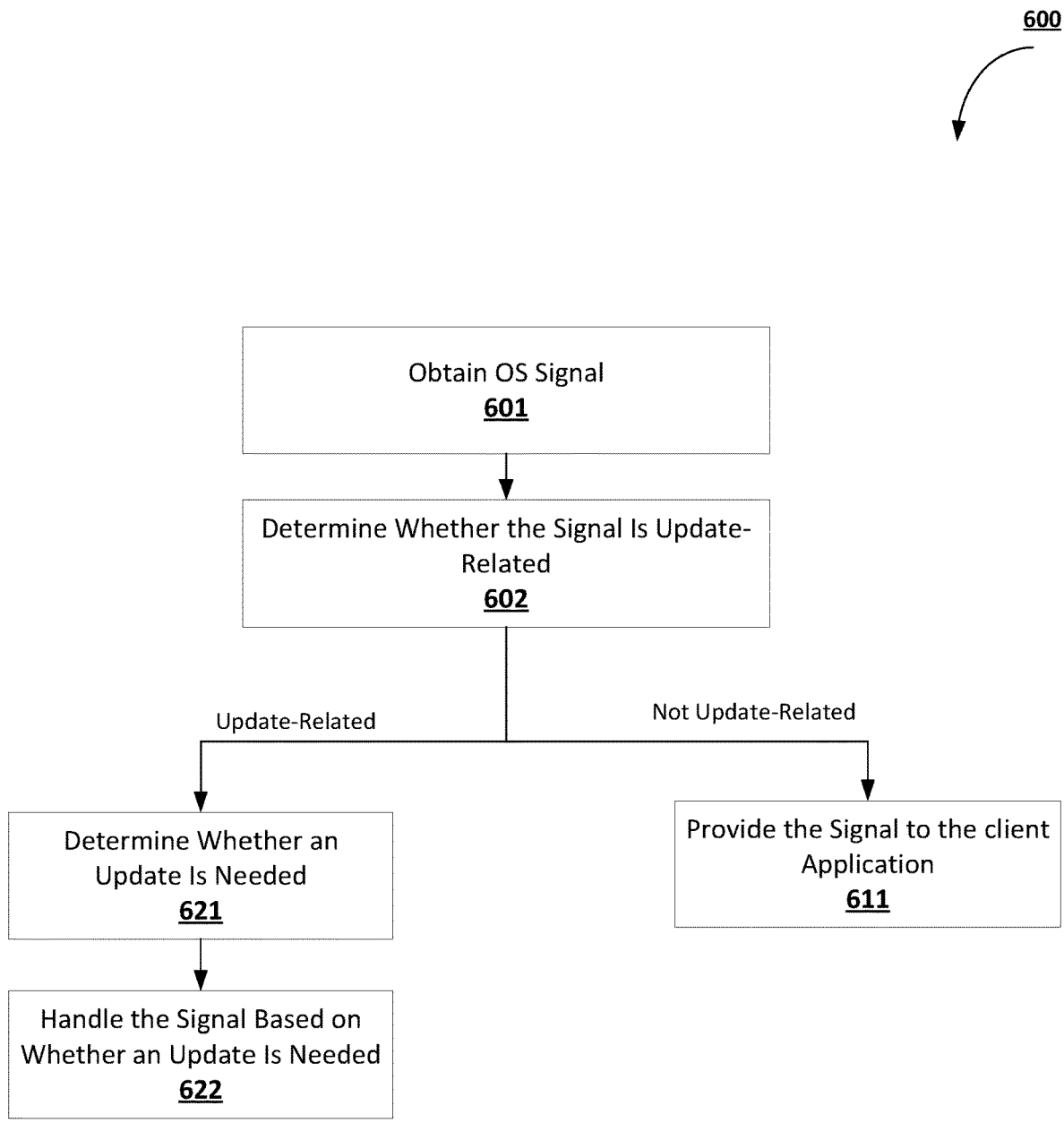

FIG. 6 is a flowchart diagram of an example process for filtering commands transmitted by an operating system for a client application in accordance with one embodiment of the present invention.

Figure 7:
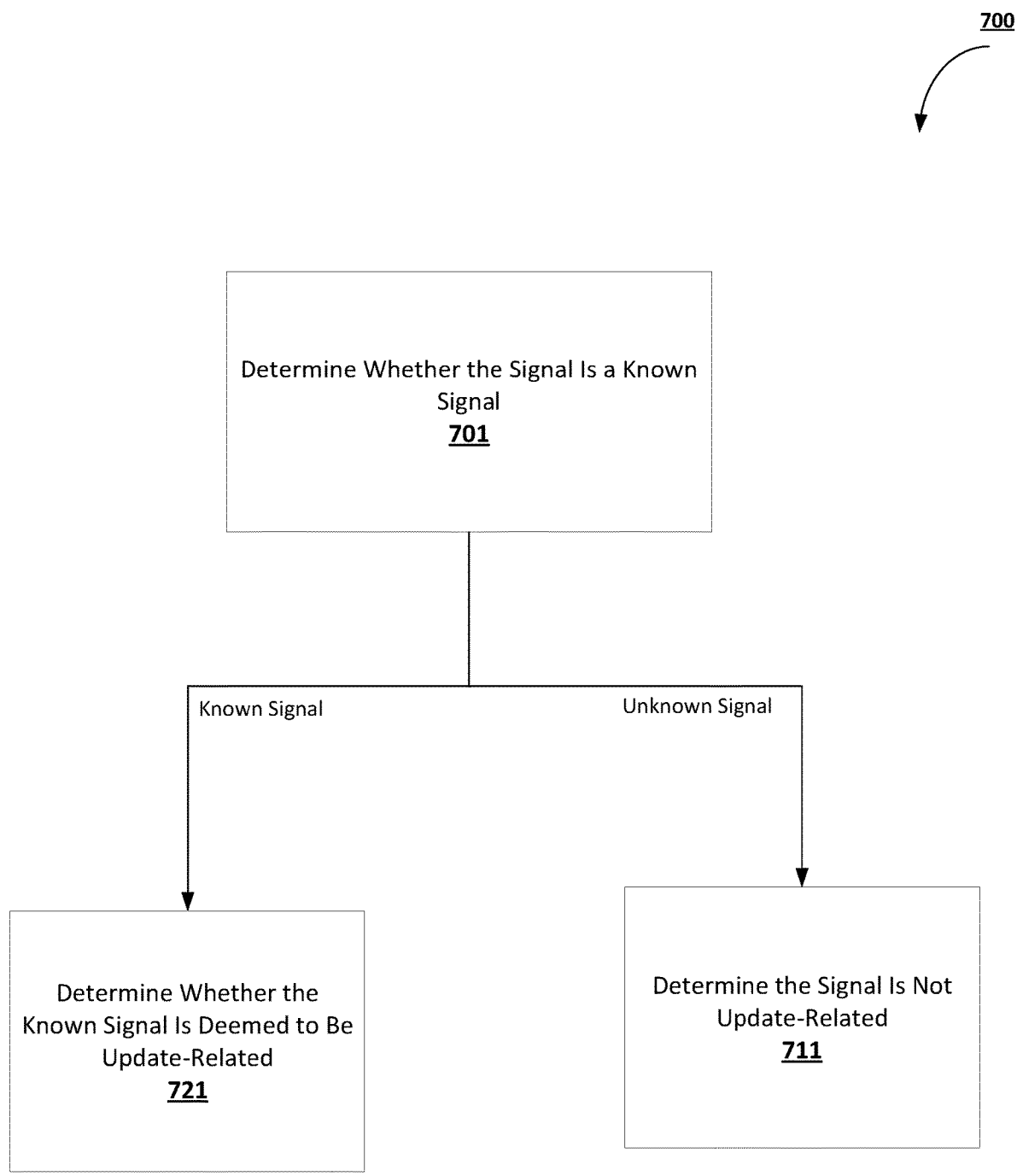

FIG. 7 is a flowchart diagram of an example process for determining if a command is update-related in accordance with one embodiment of the present invention.

Figure 8:
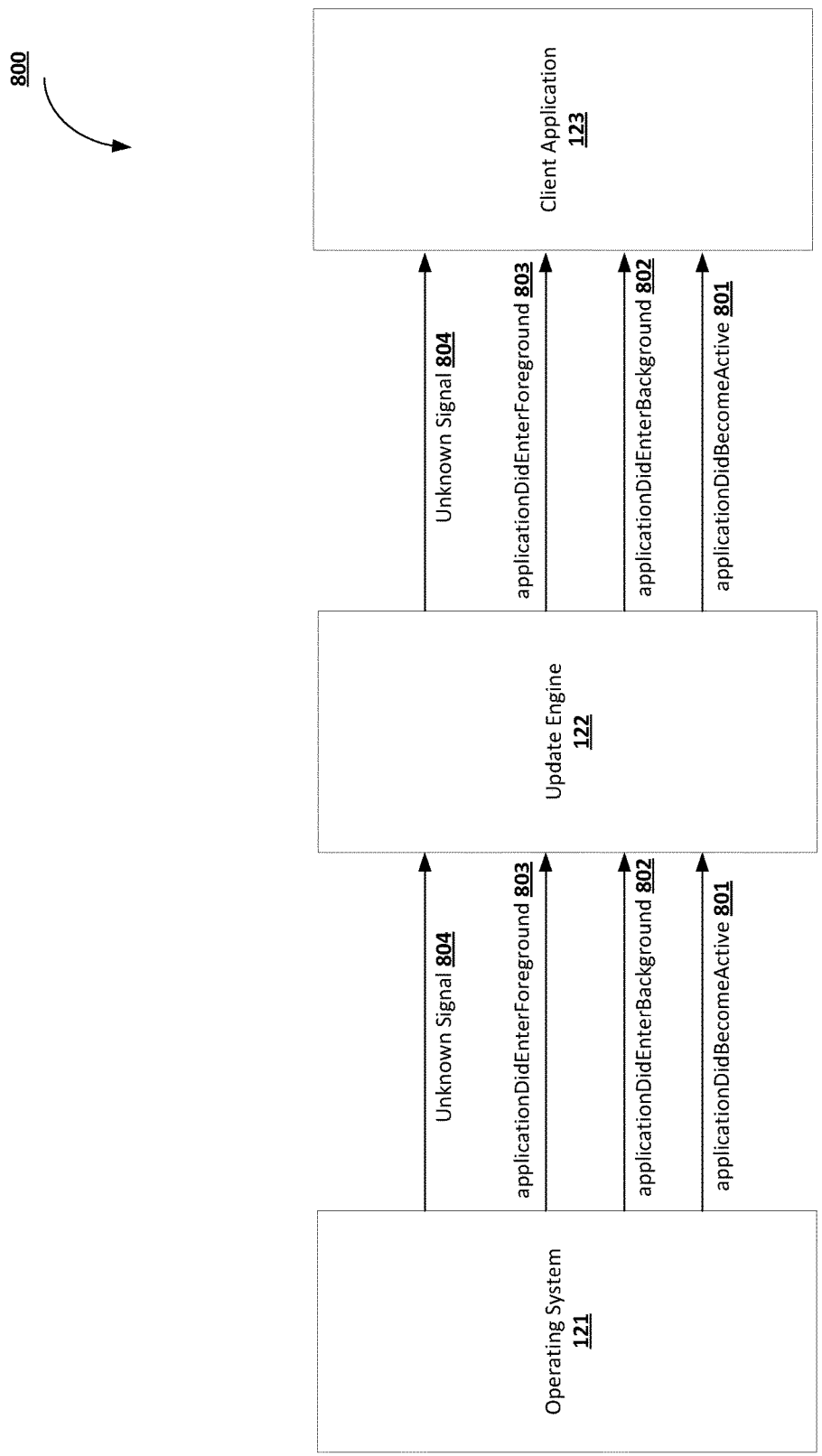

FIG. 8 provides an operational example of operating system command forwarding in accordance with one embodiment of the present invention.

Figure 9:
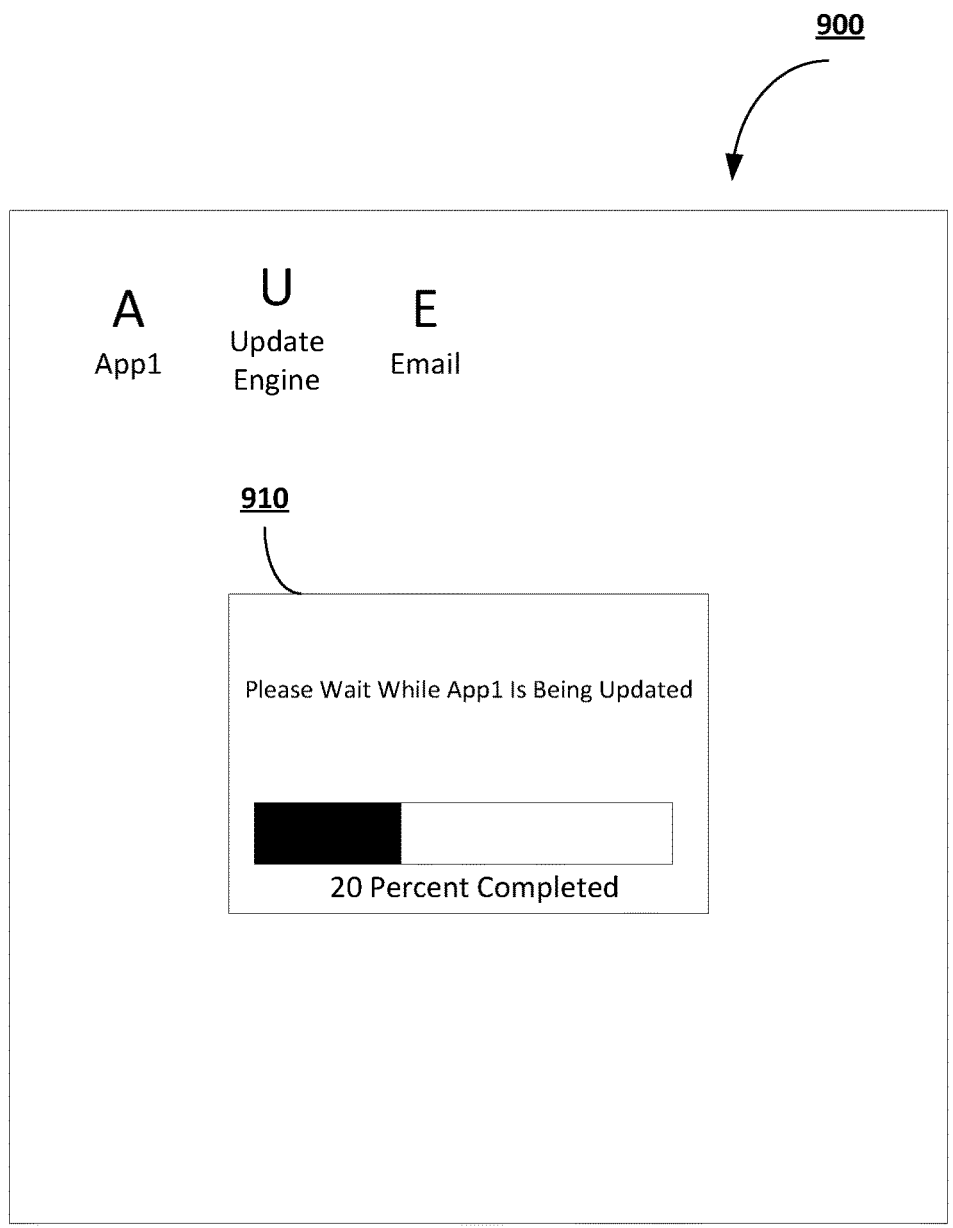

FIG. 9 provides an operational example of an update interface in accordance with one embodiment of the present invention.

Figure 10A:
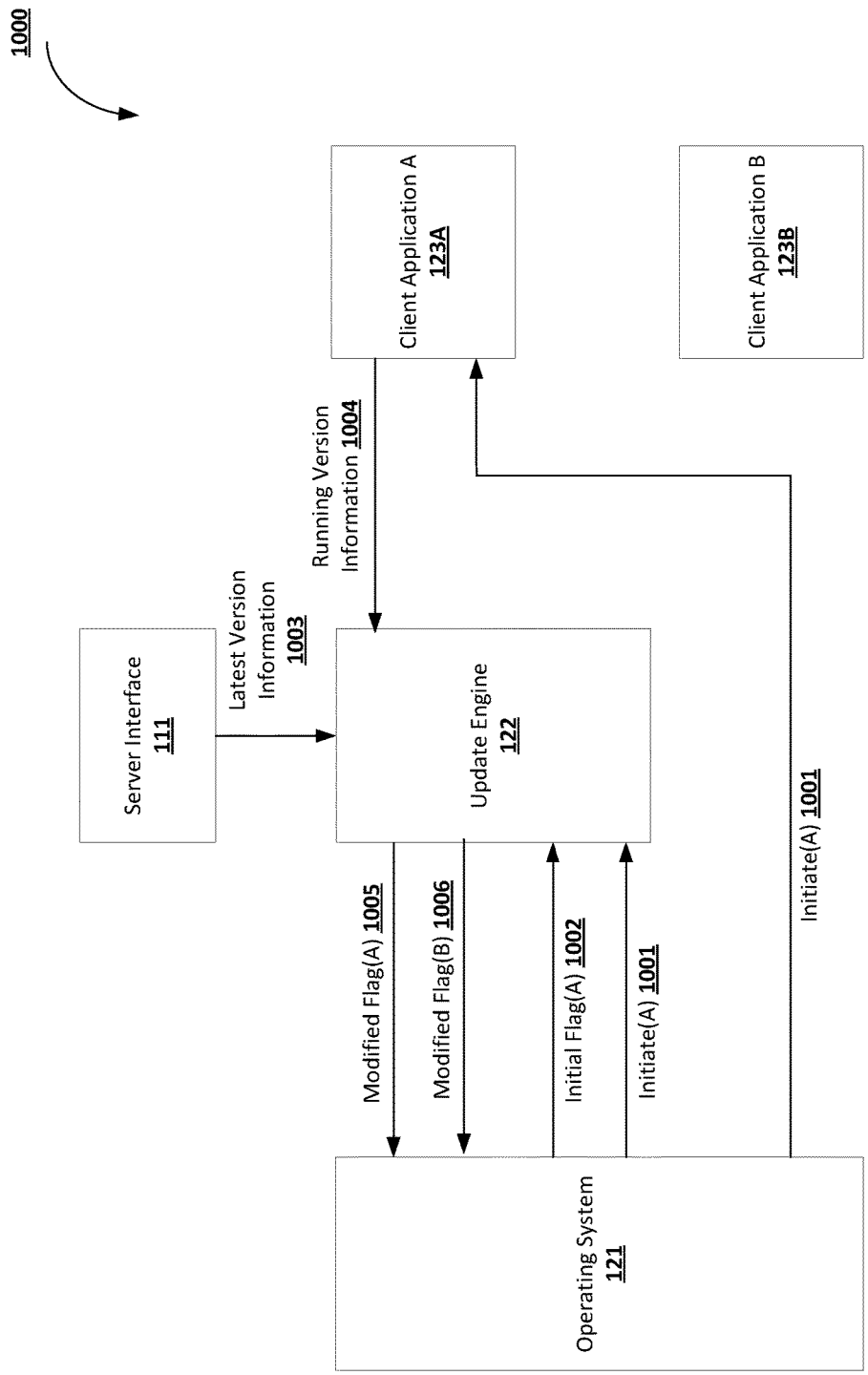
Figure 10B:
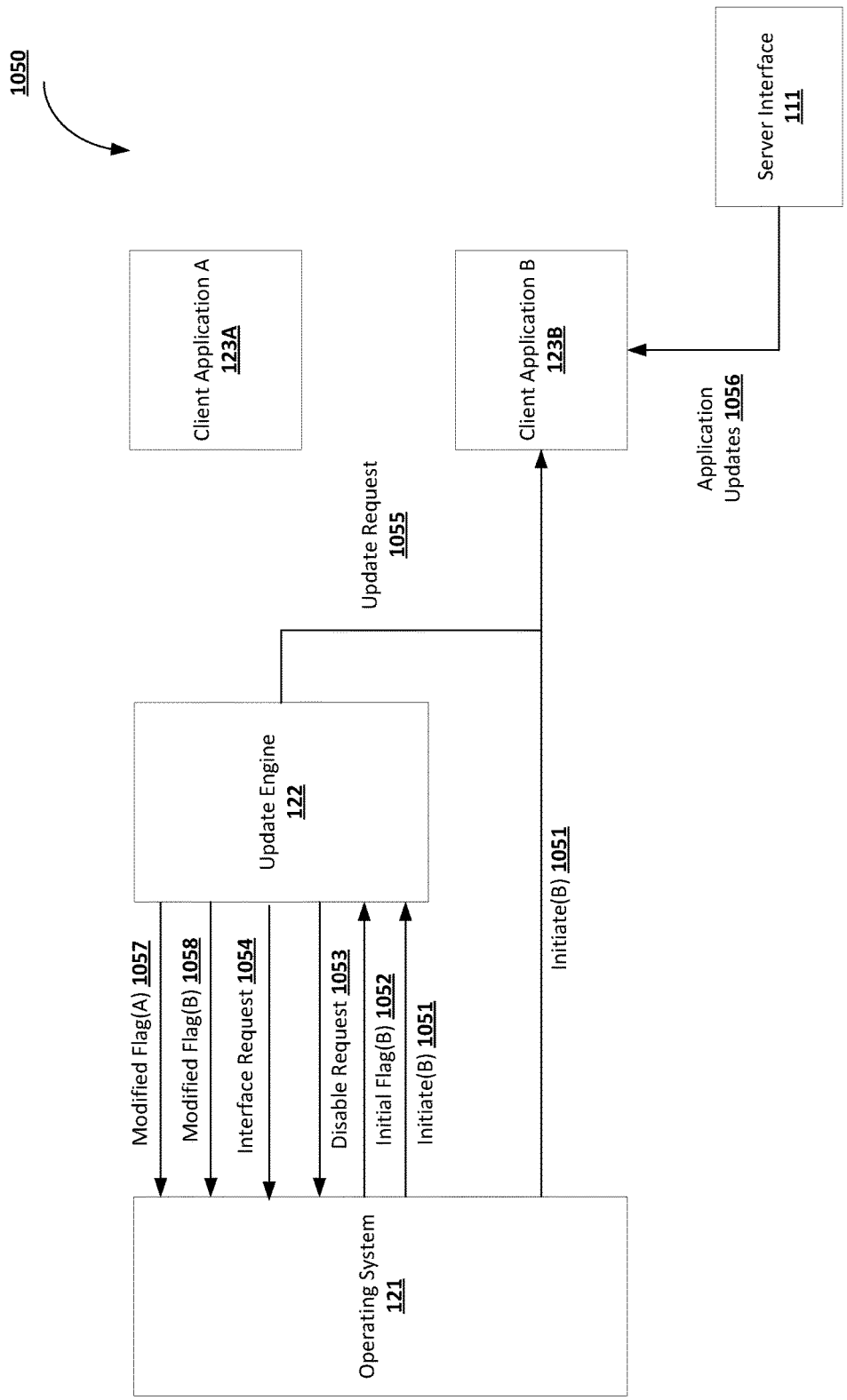

FIGS. 10A-10B are data flow diagrams for example processes for performing coordinated multi-application update management in accordance with one embodiment of the present invention.

Figure 11:
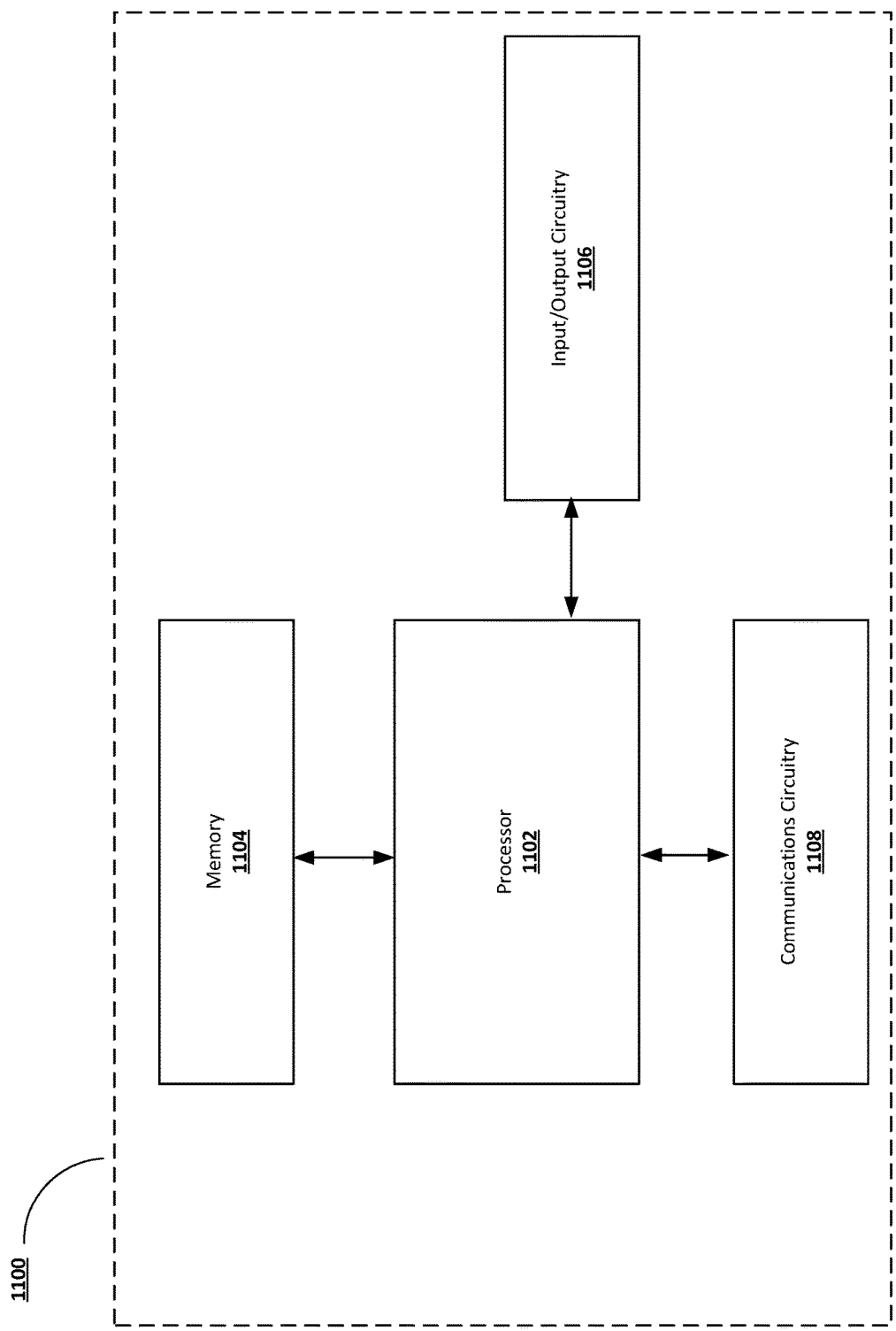

FIG. 11 is a schematic diagram of an example apparatus for a server device in accordance with one embodiment of the present invention.

Figure 12:
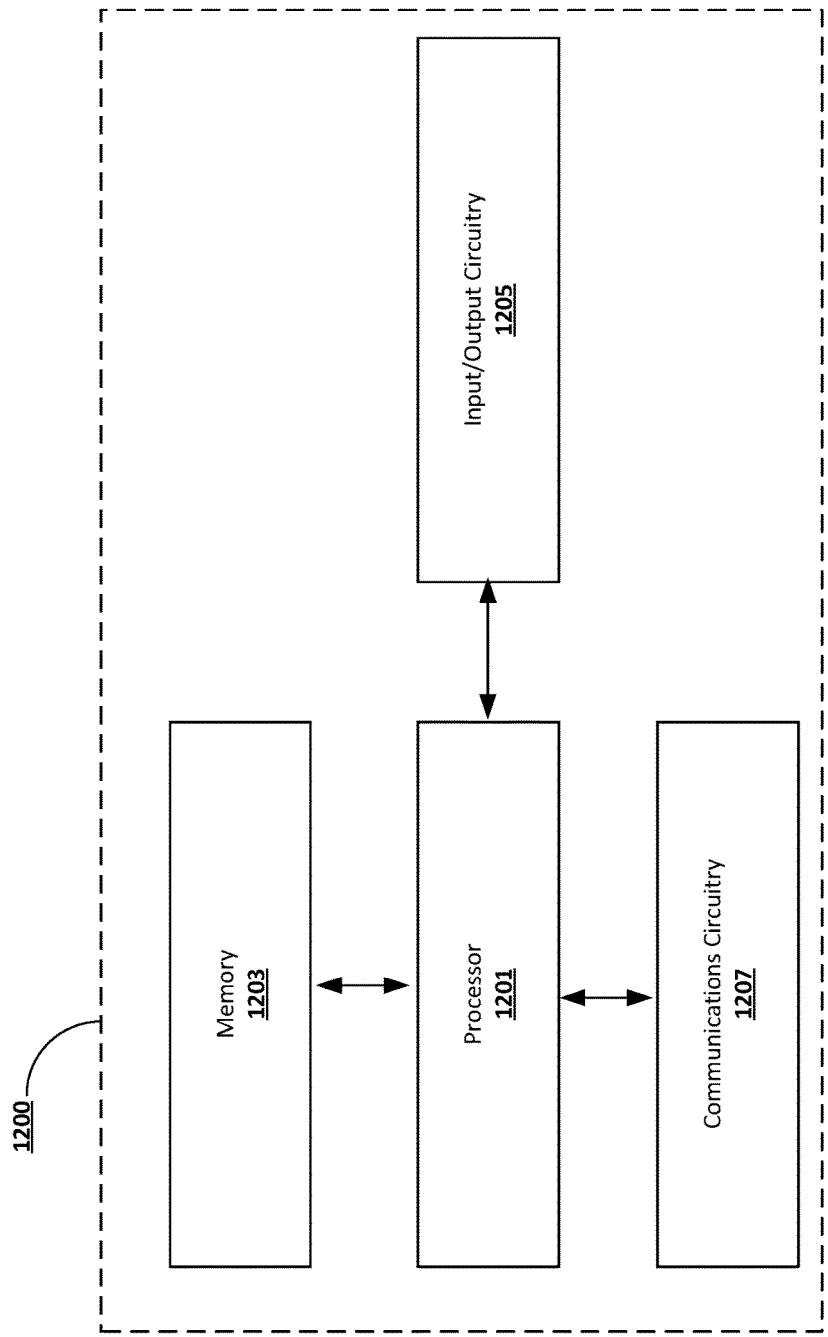

FIG. 12 is a schematic diagram of an example apparatus for a client device in accordance with one embodiment of the present invention.

DETAILED DESCRIPTION OF VARIOUS EMBODIMENTS

Various embodiments of the present invention are described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention provide for techniques for software application update management that implement at least one of the following innovative concepts: update isolation, update queuing, lifecycle-based update management, operating system command filtering, and coordinated multi-application update management. Each of the noted innovative concepts improve the efficiency, reliability, and/or adaptability of software application update management for software applications operating on computing devices.

For example, various embodiments of the present invention implement update isolation, which relates to execution of a software application in an isolated state during a period (i.e., an isolation period) related to updating the software application. Executing a software application in an isolated state may prevent user interaction with the software application, cause execution of an update operational logic associated with the software application, and/or prevent execution of a customary operational logic for the software application. Establishment and enforcement of the isolated state may occur concurrently with display of an update interface, which may be a combination of user interface elements configured to communicate to a user information about execution of a software application update, communicate to a user information about enforcement of an isolated state with respect to a software application, and/or validate user authentication of a software application update for a software application. Because of update isolation, user interaction with a software application and/or execution of customary application operations associated with a software application are significantly reduced and/or eliminated during time periods associated with software application updates. This in turn reduces and/or eliminates any efficiency drawbacks and/or reliability drawbacks associated with user interaction with a software application and/or associated with customary operational logic execution during update-critical periods. Thus, by implementing update isolation, various embodiments of the present invention improve efficiency and reliability of software application update management.

Various embodiments of the present invention implement update queuing, which relates to utilizing an update queue flag value for a software application to cause a software application update upon a subsequent detection of a qualified lifecycle command for the software application. For example, various embodiments of the present invention maintain an update queue flag for a software application, where the update queue flag may indicate an update-queued status for the software application or an update check status for the software application. Upon detection of a qualified lifecycle command (e.g., an initiation command) for a software application, an update engine may determine if the update queue flag value for the software application indicates an update-queued status or an update check status: in the former case, the update engine may cause the execution of application software updates as part of processing the qualified lifecycle command, while in the latter case the update engine may not cause execution of any software application updates and may instead cause an update need determination (i.e., a determination of if the software application needs an update) and an adjustment (i.e., a maintenance or a modification) of the update queue flag value according to the update need determination. For example, upon a determination of a need for software application updates upon detection of a qualified lifecycle command, the update engine may refuse to cause execution of the update and instead set the value of the update queue flag to indicate an update-queued status, which may in turn trigger a software application update during detection of a future (e.g., a subsequent) qualified lifecycle command. In this way, the update engine in essence delays a software application update, thus reducing frequency of software application updates. By reducing frequency of software application updates, update queuing can be critical to efficiency of data-intensive software application updates that can be more expensive and time-consuming, can minimize execution latency of big-data software applications, and can improve efficiency of software application update management.

Various embodiments of the present invention implement lifecycle-based update management, which relates to performing an update processing routine for a software application upon detection of particular qualified lifecycle commands for the software application. While several embodiments of the present invention discussed herein describe performing update processing routines in response to detecting initiation commands associated with software application launches, one of ordinary skill in the art will readily recognize and appreciate that the concepts disclosed herein can be used to perform update processing routines in response to other qualified lifecycle commands, where a qualified lifecycle command may be a lifecycle command designated to trigger performance of an update processing routine and a lifecycle command (defined below) for a software application may be triggered by an operating system (e.g., through interactions with a software application and/or a user, such as through push notifications or timers) to indicate and/or cause changes in the state of an activity associated with the software application. Because qualified lifecycle commands for a software application represent user interaction milestones associated with the software application, tying performance of update processing routines to such milestones can enhance reliability of the software application updates for users. For example, performing update processing routines synchronously with application launches can ensure reliability of software applications during entire application usage sessions, as application launches may correspond to initial user interactions with software applications. Thus, by performing software application updates at particular points during the lifecycle of software applications, various embodiments of the present invention tie timing of software application updates to user interaction milestones and improve reliability of software application update management.

Various embodiments of the present invention implement operating system command filtering, which relates to identifying operating system commands for a software application, performing update processing routine operations for the software application upon detecting selected operating system commands (e.g., qualified lifecycle commands), and forwarding other operating system commands to the software application without performing update processing routines. Operating system command filtering may enable software application update management in devices that have non-interceptive operating systems. Such operating systems may disable detection of qualified lifecycle commands for a particular software application. Thus, to detect qualified lifecycle commands in devices that have such non-interceptive operating systems, update engines may be configured to receive all operating system commands for a particular software application and filter those commands to detect qualified lifecycle commands. For example, in some devices that have a non-interceptive operating system, an update engine may receive operating system commands for a software application, execute update processing routines in response to detecting qualified lifecycle commands (e.g., initiation commands) for the software application, and forward other operating system commands (e.g., every command that is not an initiation command) for software application to the software application without performing any update processing routines. In this way, an update engine in a device having a non-interceptive operating system can effectively replicate the effect of selective interception of operating system commands even though such a functionality may not be enabled by non-interceptive operating systems. Thus, by utilizing operating system command filtering, various embodiments of the present invention improve adaptability of software application update management.

Various embodiments of the present invention enable coordinated multi-application update management, which relates to determining a need to update any two or more software applications that use a shared resource with detection of the need to update the shared resource upon the detection of a qualified lifecycle command for any one of those software applications. In some embodiments, when two or more software applications use a shared resource, detection of a qualified lifecycle command for any one of those two or more software applications may lead to a chain of operations that may cause an adjustment of an update queue flag value for all of the two or more software applications. In doing so, all but one of the two or more software applications may benefit from update queuing without a need for detection of a qualified lifecycle command for those software applications. Moreover, after the o detection of a qualified lifecycle command for a first software application of the two or more software applications, detection of a qualified lifecycle command for any one of the two or more software applications may cause an update of the shared resource for all of the two or more software applications. In this way, performing a collective update routine for the two or more software application can ensure that all of the two or more software applications have access to an updated version of the shared data resource with fewer application updates, fewer update need determinations, and fewer detections of qualified lifecycle commands. Thus, by utilizing coordinated multi-application update management, various embodiments of the present invention increase efficiency and reliability of software applications updates for the software applications that utilize a shared resource.

Thus, various embodiments of the present invention can improve efficiency of software application update management by utilizing at least one of update isolation, update queuing, and coordinated multi-application update management. Furthermore, various embodiments of the present invention improve reliability of software application update management by utilizing at least one of update isolation, lifecycle-based update management, and coordinated multi-application update management. Moreover, various embodiments of the present invention improve adaptability of software application update management by utilizing operating system command filtering.

Definitions

The term "comprising" means "including but not limited to," and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a device is described herein to receive data from another device, it will be appreciated that the data may be received directly from another device or may be received indirectly via one or more intermediary devices, such as, for example, one or more servers, relays, routers, network access points, base stations, hosts, and/or the like (sometimes referred to herein as a "network"). Similarly, where a device is described herein to send data to another device, it will be appreciated that the data may be sent directly to another device or may be sent indirectly via one or more intermediary devices, such as, for example, one or more servers, relays, routers, network access points, base stations, hosts, and/or the like.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "user" should be understood to refer to an individual, group of individuals, business, organization, and the like. The users referred to herein may access a server system using client devices (as defined herein).

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The terms "command" or "operating system command" refers to any command, call, non-transitory command, and/or data transmitted by the operating system to a software application (e.g., to a module or circuitry associated with a software application). Operating system commands may enable a software application to utilize at least some of the hardware resources associated with a computing device, such as the input/output hardware resources associated with a computing device. Examples of operating system commands include lifecycle commands, such as initiation commands.

The term "lifecycle command" refers to an operating systems command that is configured to cause a change in an extent and/or a mode of user interaction with a software application. Examples lifecycle commands include the following commands issued by the Android operating system: onCreate, onStart, onResume, onPause, onStop, and onDestroy. Example lifecycle commands further include the following commands issued by the iPhone operating system (iOS): application(_:willFinishLaunchingWithOptions:), application(_:didFinishLaunchingWithOptions:), applicationDidBecomeActive(_:), and applicationWillResignActive(_:).

The term "initiation command" refers to a lifecycle command that is configured to cause a software application to launch and/or is configured to indicate to a software application that a user of a computing device has requested launch of the software application. For example, an operating system may transmit an initiation command in response to a user clicking on a graphic user interface icon of a software application. Examples of initiation commands include the onCreate command in the Android operating system and the application(_:willFinishLaunchingWithOptions) command in iOS.

The term "qualified lifecycle command" refers to any lifecycle command having a type that is designated (e.g., based on user input and/or configuration data) to cause execution of an update processing routine for a software application. For example, in various embodiments of the present invention, detection of an initiation command (i.e., a lifecycle command having an initiation command type) for a software application may cause execution of an update processing routine for the software application. Thus, in the described embodiments of the present invention, an initiation command is a qualified lifecycle command.

The term "update processing routine" refers to obtaining a value of an update queue flag, performing a first group of defined operations (e.g., including an update need determination for a software application and adjustment of an update flag value for the software application in accordance with the update need determination) responsive to the update flag value indicating an update check status, and performing a second group of defined operations (e.g., performing a software update for a software application while the software application is in an isolated state and adjusting an update flag value for the software application after the update) responsive to the update flag value indicating an update queued status. An update processing routine may be executed in response to detecting a qualified lifecycle command.

The term "interceptive operating system" refers to an operating system software application that is configured to enable a first software application (e.g., an update engine as discussed in detail below) to receive some or all of the operating system commands command that are intended for a second software application. For example, an interceptive operating system may transmit an initiation command for the second software application both to the second software application and to the first software application. An example of an interceptive operating system is the Android operating system. In some embodiments, an interceptive operating system is configured to enable particular software applications (e.g., particular software applications designated by a user) to detect some or all of user interactions with software applications other than the particular software applications. For example, an interceptive operating system may enable a particular software application to detect all user interactions with a device associated with the operating system. As another example, an interceptive operating system may enable a first software application to detect user interactions with the first software application and a second software application.

The term "non-interceptive operating system" refers to an operating system software application that is not configured to enable a first software application to receive some or all of the operating system commands for a second software application. For example, a non-interceptive operating system may only transmit an initiation command for the second software application to the second software application and not to the first software application. An example of a non-interceptive operating system is the iOS operating system. In some embodiments, a non-interceptive operating system is configured to enable each software application to detect only user interactions with the software application only.

The term "update queue flag" refers to data associated with a software application that indicates to an update engine if the software application is in an update queued status, an update check status, or a different status (e.g., an update unavailable status). For example, the update queue flag value for a software application may be a Boolean value. In some embodiments, the update queue flag value for a software application indicates if an update of the software application is needed during a launch of the software application associated with a retrieval of the update queue flag value (e.g., during a launch of the software application that is synchronous with the retrieval of the update queue flag value). In some embodiments, the update queue flag value for a software application indicates if an update of the software application is needed during a first launch of the software application after a last modification of the update queue flag value for the software application. The update queue flag for a software application may be stored in at least one computer readable storage media, such as on a memory storage medium and/or on a permanent storage medium associated with a computing device.

The term "update queued status" refers to a status indicated by a value of an update queue flag for a software application which indicates that a software application update is needed. An update queue flag may indicate an update-queued status if, upon detection of a previous qualified lifecycle command, an update engine performed an update need determination and determined that a software application update is needed.

The term "update check status" refers to a status indicated by a value of an update queue flag for a software application which indicates that an update need determination is needed. An update queue flag may indicate an update check status if, upon detection of a previous qualified lifecycle command, an update engine caused an update of the software application. An update check status may indicate that an update of a software application is not needed.

The term "update need determination" refers to a set of one or more operations configured to determine if a software application needs a software application update. For example, an update engine may perform update need determination by determining a latest available version of a data resource used by the software application and determining if the software application has access to the latest available version.

The term "update unavailable status" refers to a status indicated by a value of an update queue flag for a software application which indicates that an update need determination is needed but a corresponding software application update is not available. For example, the update queue flag for a software application may indicate an update unavailable status if the software application is a legacy software application, e.g., if a computing device uses a legacy version of a software application.

The term "isolated state" refers to a mode of execution of a software application in which at least one of the following conditions is enforced: (i) a user is not permitted to interact with (e.g., provide inputs to and/or receive outputs from) a software application; and (2) customary operational logic of a software application is not executed. For example, in some embodiments, a software application executing in an isolated state is not be able to receive user inputs, but is able to provide outputs to the user, e.g., through push notifications and/or timers. As another example, in some embodiments, a software application executing in an isolated state is not able to receive user inputs or provide user outputs. In some embodiments, when executed in an isolated state, update operational logic of a software application is performed. A software application may be in the isolated state for an isolation period.

The term "isolation period" refers to a period of time in which an isolation period is enforced for a software application. The isolation period may include some or all of the time period between a time of detecting a need for updating a software application and a time of termination of a corresponding software application update.

The term "customary operational logic" of a software application refers to a set of one or more software application operations configured to be performed in response to receiving a qualified lifecycle command when the software application is not in an isolated state. For example, a software application may be configured to launch and display a welcome message in response to receiving an initiation command when the software application is not in an isolated state. Thus, in the described example, launching normally and displaying a welcome message can be said to be part of the customary operational logic of the software application.

The term "update operational logic" of a software application refers to a set of one or more software applications operations configured to be performed in order to enable a user to request and/or perform a software application update (e.g., by requesting the software application update through a software platform that enables a user to request software application updates, such as the App Store and the Google Play Store). For example, the update operational logic of a software application may include causing the launch of a user interface configured to enable a user to request a software application update. As another example, the update operational logic of a software application may include retrieving an updated version of a data resource (e.g., a code resource) from a server system and using (e.g., executing) the retrieved updated version to modify at least one aspect of operation of the software application.

The term "update engine" refers to a software application configured to detect qualified lifecycle commands for at least one software application and, in response to detecting a qualified lifecycle command for a software application, perform an update processing routine based on a current value of an update queue flag. The update engine may be configured to perform application update management in accordance with at least one of update isolation, update queuing, lifecycle-based update management, operational system filtering, and coordinated multi-application update management. Example System Architecture for Implementing Embodiments of the Present Invention Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the device may include fixed devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present invention may operate. The architecture 100 includes a server device 101 that communicates with one or more client devices, such as client device 102, using a communication network 103. The server device 101 includes a server interface 111 and a data repository 112. The client device 102 includes an operating system 121 and a client application framework 105, which may be a combination of one or more software components configured to execute one or more client applications 123 and manage software application updates for the one or more client applications 123. The client application framework 105 may include an update engine 122 and the client applications 123, such as a client applications 123A-N.

The communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 103 may include a cellular telephone, an 902.11, 902.16, 902.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the server device 101 and/or the client device 102. In one embodiment, the protocol is a custom protocol of JSON objects sent via a Websocket channel. In one embodiment, the protocol is JSON over RPC, JSON over REST/HTTP, and the like.

The server device 101 may be embodied as a computer or computers as known in the art. The server device 101 may provide for sending electronic data and/or receiving electronic data from various sources, including but not limited to the client devices 102. An example architecture for the server device 101 is depicted in the apparatus 1100 of FIG. 11.

The client device 102 may be any device as defined above. Electronic data transmitted between the server device 101 and the client device 102 may be provided in various forms and via various methods. For example, the client devices 102 may include desktop computers, laptop computers, smartphones, netbooks, tablet computers, wearables, and the like. An example architecture for a client device 102 is depicted in the apparatus 1200 of FIG. 12.

The server interface 111 is a software application that is configured to receive and perform requests by client devices 102 to the server device 101. For example, the server interface 111 may be configured to receive and performs requests from a client device 102 for obtaining data stored in the data repository 112.

The data repository 112 is a combination of one or more storage computing resource configured to store data associated with the server device 101 that a client device 102 may seek to retrieve. Each storage computing resource associated with the data repository 112 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. In some embodiments, in response to a request by a client device 102 to retrieve data stored in the data repository 112, the server interface 111 locates the data in the data repository 112, retrieves the located data, and transmits the retrieved data to the requesting client device 102.

The client device 102 is configured to allow execution of one or more software applications, such as the client application 123. To facilitate the execution of the client applications, the client device includes the operating system 121, which is a software application that manages access to at least some hardware resources of the client device 102. For example, the operating system 121 may be configured to perform at least one of file management for the client device 102, memory management for the client device 102, process management for the client device 102, handling input and output for the client device 102, and controlling operation of peripheral devices for the client device 102 such as disk drives and printers. Examples of operating systems for mobile client devices 102 include iOS and Android operating systems. Examples of operating systems devices personal computer client devices 102 include Windows, macOS, and Linux operating systems.

The update engine 122 is a software application configured to communicate with the operating system 121, a group of the software applications (such as a group including the client application 123), and the server interface 111 to manage updates to the group of software applications. In some embodiments, the update engine 122 is configured to perform updates to the group of software applications that conform to at least one of update isolation, update queuing, lifecycle-based update management, operating system command filtering, and coordinated multi-application update management, as those concepts are further described above. Some of the functionalities associated with the update engine 122 are described in greater detail below with reference to FIGS. 3-10.

Although the architecture 100 of FIG. 1 depicts a single update engine 122 for the one or more client applications 123 of the client application framework 105, a person of ordinary skill in the art will recognize and appreciate that the client application framework 105 may include multiple update engines 122, e.g., each client application of multiple client applications 123 may have an application-specific update engine 122, where the application-specific update engine 122 for a particular client application 123 may in some embodiments be a part of the client application 123. Moreover, a person of ordinary skill in the art will recognize and appreciate that, if a software application framework 105 includes multiple client applications 123 and multiple update engines 122, the multiple update engines 122 may be configured to (e.g., directly or through an intermediary computing entity, such as the server device 102) communicate to coordinate various functionalities, such as functionalities related to coordinated multi-application update management (e.g., as further described below).

An example architecture for the server device 101 is depicted in the apparatus 1100 of FIG. 11. As depicted in FIG. 11, the apparatus 1100 includes processor 1102, memory 1104, input/output circuitry 1106, and communications circuitry 1108. Although these components 1102-1110 are described with respect to functional limitations, it should be understood that the particular implementations necessarily include the use of particular hardware. It should also be understood that certain of these components 1102-1112 may include similar or common hardware. For example, two sets of circuitries may both leverage use of the same processor, network interface, storage medium, or the like to perform their associated functions, such that duplicate hardware is not required for each set of circuitries.

In one embodiment, the processor 1102 (and/or co-processor or any other processing circuitry assisting or otherwise associated with the processor) may be in communication with the memory 1104 via a bus for passing information among components of the apparatus. The memory 1104 is non-transitory and may include, for example, one or more volatile and/or non-volatile memories. In other words, for example, the memory 1104 may be an electronic storage device (e.g., a computer-readable storage medium). The memory 1104 may be configured to store information, data, content, applications, instructions, or the like for enabling the apparatus to carry out various functions in accordance with example embodiments of the present invention.

The processor 1102 may be embodied in a number of different ways and may, for example, include one or more processing devices configured to perform independently. In some preferred and non-limiting embodiments, the processor 1102 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 1102 may be configured to execute instructions stored in the memory 1104 or otherwise accessible to the processor 1102. In some preferred and non-limiting embodiments, the processor 1102 may be configured to execute hard-coded functionalities. As such, if configured by hardware or software methods, or by a combination thereof, the processor 1102 may represent an entity (e.g., physically embodied in circuitry) capable of performing operations according to an embodiment of the present invention while configured accordingly. Alternatively, as another example, when the processor 1102 is embodied as an executor of software instructions, the instructions may specifically configure the processor 1102 to perform the algorithms and/or operations described herein when the instructions are executed.

In one embodiment, the apparatus 1100 may include input/output circuitry 1106 that may, in turn, be in communication with processor 1102 to provide output to the user and, in one embodiment, to receive an indication of a user input. The input/output circuitry 1106 may comprise a user interface and may include a display, and may comprise a web user interface, a mobile application, a client device, a kiosk, or the like. In one embodiment, the input/output circuitry 1106 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 1104, and/or the like).

The communications circuitry 1108 may be any means such as a device or circuitry embodied in either hardware or a combination of hardware and software that is configured to receive and/or transmit data from/to a network and/or any other device, circuitry, or module in communication with the apparatus 1100. In this regard, the communications circuitry 1108 may include, for example, a network interface for enabling communications with a wired or wireless communication network.

For example, the communications circuitry 1108 may include one or more network interface cards, antennae, buses, switches, routers, modems, and supporting hardware and/or software, or any other device suitable for enabling communications via a network. Additionally or alternatively, the communications circuitry 1108 may include the circuitry for interacting with the antenna/antennae to cause transmission of commands via the antenna/antennae or to handle receipt of commands received via the antenna/antennae.

It is also noted that all or some of the information discussed herein can be based on data that is received, generated and/or maintained by one or more components of apparatus 1100. In one embodiment, one or more external systems (such as a remote cloud computing and/or data storage system) may also be leveraged to provide at least some of the functionality discussed herein.

An example architecture for a client device 102 is depicted in the apparatus 1200 of FIG. 12. As depicted in FIG. 12, the apparatus 1200 includes processor 1201, memory 1203, input/output circuitry 1205, and communications circuitry 1207. Although these components 1201-1207 are described with respect to functional limitations, it should be understood that the particular implementations necessarily include the use of particular hardware. It should also be understood that certain of these components 1201-1207 may include similar or common hardware. For example, two sets of circuitries may both leverage use of the same processor, network interface, storage medium, or the like to perform their associated functions, such that duplicate hardware is not required for each set of circuitries.

In one embodiment, the processor 1201 (and/or co-processor or any other processing circuitry assisting or otherwise associated with the processor) may be in communication with the memory 1203 via a bus for passing information among components of the apparatus. The memory 1203 is non-transitory and may include, for example, one or more volatile and/or non-volatile memories. In other words, for example, the memory 1203 may be an electronic storage device (e.g., a computer-readable storage medium). The memory 1203 may be configured to store information, data, content, applications, instructions, or the like for enabling the apparatus 1200 to carry out various functions in accordance with example embodiments of the present invention.

The processor 1201 may be embodied in a number of different ways and may, for example, include one or more processing devices configured to perform independently. In some preferred and non-limiting embodiments, the processor 1201 may include one or more processors configured in tandem via a bus to enable independent execution of instructions, pipelining, and/or multithreading.

In some preferred and non-limiting embodiments, the processor 1201 may be configured to execute instructions stored in the memory 1203 or otherwise accessible to the processor 1201. In some preferred and non-limiting embodiments, the processor 1201 may be configured to execute hard-coded functionalities. As such, if configured by hardware or software methods, or by a combination thereof, the processor 1201 may represent an entity (e.g., physically embodied in circuitry) capable of performing operations according to an embodiment of the present invention while configured accordingly. Alternatively, as another example, when the processor 1201 is embodied as an executor of software instructions, the instructions may specifically configure the processor 1201 to perform the algorithms and/or operations described herein when the instructions are executed.

In one embodiment, the apparatus 1200 may include input/output circuitry 1205 that may, in turn, be in communication with processor 1201 to provide output to the user and, In one embodiment, to receive an indication of a user input. The input/output circuitry 1205 may comprise a user interface and may include a display, and may comprise a web user interface, a mobile application, a client device, a kiosk, or the like. In one embodiment, the input/output circuitry 1205 may also include a keyboard, a mouse, a joystick, a touch screen, touch areas, soft keys, a microphone, a speaker, or other input/output mechanisms.

The communications circuitry 1207 may be any means such as a device or circuitry embodied in either hardware or a combination of hardware and software that is configured to receive and/or transmit data from/to a network and/or any other device, circuitry, or module in communication with the apparatus 1200. In this regard, the communications circuitry 1207 may include, for example, a network interface for enabling communications with a wired or wireless communication network. For example, the communications circuitry 1207 may include one or more network interface cards, antennae, buses, switches, routers, modems, and supporting hardware and/or software, or any other device suitable for enabling communications via a network. Additionally or alternatively, the communications circuitry 1207 may include the circuitry for interacting with the antenna/antennae to cause transmission of commands via the antenna/antennae or to handle receipt of commands received via the antenna/antennae.

It is also noted that all or some of the information discussed herein can be based on data that is received, generated and/or maintained by one or more components of apparatus 1200. In one embodiment, one or more external systems (such as a remote cloud computing and/or data storage system) may also be leveraged to provide at least some of the functionality discussed herein.

In one embodiment, other elements of the apparatus 1100 may provide or supplement the functionality of particular circuitry. For example, the processor 1102 may provide processing functionality, the memory 1104 may provide storage functionality, the communications circuitry 1108 may provide network interface functionality, and the like. Similarly, other elements of the apparatus 1200 may provide or supplement the functionality of particular circuitry. For example, the processor 1201 may provide processing functionality, the memory 1203 may provide storage functionality, the communications circuitry 1207 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows of Embodiments of the Present Invention

Various methods described hereinafter provide many technical improvements over computer functionalities. For example, various embodiments of the present invention can improve efficiency of software application update management by utilizing at least one of update isolation, update queuing, and coordinated multi-application update management. Furthermore, various embodiments of the present invention improve reliability of software application update management by utilizing at least one of update isolation, lifecycle-based update management, and coordinated multi-application update management. Moreover, various embodiments of the present invention improve adaptability of software application update management by utilizing operating system command filtering.

Application Update Management

FIGS. 2A-2B provide data flow diagrams of example processes 1100, 250 for launching the client application 123 on a client device 102 whose operating system 121 is an interceptive operating system (i.e., an interceptive device). In particular, the process 200 of FIG. 2A is an example process for launching the client application 123 on an interceptive device without updating the client application 123, while the process 250 of FIG. 2B is an example process for launching the client application 123 on an interceptive device while updating the client application 123. The process 200 of FIG. 2A may be executed by various components of the architecture 100 during a first launch of the client application 123 and/or during a first launch of the client application 123 after an update of the client application 123, while the process 250 of FIG. 2B may be executed by various components of the architecture 100 during a second launch of the client application 123 and/or during a launch of the client application that occurs after a previous launch in which the update engine 122 determines that there is a need for an update of the client application 123. While various embodiments of the present invention are described herein with reference to initiation commands and launches, one of ordinary skill in the art will readily recognize and appreciate that innovative concepts of the present invention can be implemented using lifecycle commands other than initiation commands that cause lifecycle events other than software application launches.

As depicted in FIG. 2A, the process 200 begins with transmission of an initiation command 201 from the operating system 121 to the update engine 122 and the client application 123. The initiation command 201 may be a command from the operating system 121 that a user of the client device 102 has requested a launch of the client application 123. For example, the operating system 121 may transmit an initiation command to the update engine 122 and the client application 123 in response to a user request to launch the client application 123, such as a user interaction with an icon associated with the client application 123. Examples of initiation commands transmitted by interceptive operating systems include the onCreate command transmitted by an Android operating system.

The process 200 continues with the client application 123 proceeding to launch in response to the initiation command 201 received from the operating system 121. Moreover, in response to intercepting the initiation command 201 for the client application 123, the update engine 122 first retrieves an initial update queue flag value 202 for the client application 123. For example, the update engine 122 may request (e.g., through one or more calls to an application programming interface (API) associated with the operating system 121) that the operating system 121 retrieves the initial update queue flag value 202 and receive the initial update queue flag value 202 in response to the request. The initial update queue flag value 202 may be a value stored in a storage medium of the client device 102 (e.g., a memory of the client device and/or a permanent storage medium of the client device 102, including a permanent storage segment exclusively allocated for the client application 123, for instance using the SharedPreferences functionality in the Android operating system) that indicates if the client application 123 must update. In some embodiments, the initial update queue flag value 202 is set to indicate (e.g., through indicating an update check status) a lack of a need for update of the client application 123 during a first launch of the client application 123 and/or after an update of the client application 123. In the example process 200 of FIG. 2A, the initial update queue flag value 202 indicates lack of a need for an update of the client application 123.

The process 200 continues with the update engine 122 proceeding to obtain, from the server interface 111, running version information 203 for a first data resource from the client application 123. The first data resource may be any data resource or combination of data resources that is used by the client application 123, such as a software code file that is used by a client application 123 that includes a software development environment. The running version information 203 for the first data resource may be an indication of a version of the first data resource that is available to the client application 123 (i.e., a running version of the first data resource). For example, the running version information 203 for the first data resource may be an identifier (e.g., a timestamp) of the version of the first data resource (e.g., a code resource) that is available to the client application 123. As another example, the running version information 203 for the first data resource may be a value determined by hashing some or all parts of the version of the first data resource that is available to the client application 123.

The process 200 continues with the update engine 122 proceeding to, in response to determining the lack of a need for update of the client application based on the initial update queue flag value 202, obtain latest version information 204 for a first data resource from the server interface 111. The server interface 111 may generate the latest version information 204 based on data stored in the data repository 112.

In some embodiments, the latest version information 204 for the first data resource may include an indication of whether the client application 123 has access to a latest version of the first data resource that is stored on the data repository 112. In some of those embodiments, to obtain the latest version information 204, the update engine 122 transmits an indication of the running version of the first data resource to the server interface 111 and obtains the latest version information 204 in response. To generate the latest version information 204, the server interface 111 may compare the indication of the running version of the first data resource to an indication of a latest version of the first data resource that is stored on the data repository 112 (i.e., a latest version of the first data resource). For example, the indication of the running version of the first data resource obtained by the server interface 111 may be a first numeric property (e.g., a numeric identifier, a timestamp, etc.) associated with the running version of the first data resource, and the server interface 111 may compare the first numeric property for the running version of the first data resource to a corresponding first numeric property for the latest version of the first data resource. As another example, the indication of the running version of the first data resource obtained by the server interface 111 may be a first text-string property (e.g., all or part of the content data) associated with the running version of the first data resource, and the server interface 111 may compare the first text-string property for the running version of the first data resource to a corresponding first text-string property for the latest version of the first data resource.

In some embodiments, the latest version information 204 for the first data resource may be an indication of a latest version of the first data resource that is stored on the data repository 112 of the server device 101. For example, the latest version information 404 for the first data resource may be an identifier (e.g., a timestamp) of a latest version of the first data resource (e.g., a code resource) that is stored on the data repository 112. As another example, the latest version information 404 for the first data resource may be a value determined by hashing some or all parts of a latest version of the first data resource that is stored on the data repository 112. The server interface 111 may generate the latest version information 204 based on data stored in the data repository 112.

The process 200 continues with the update engine 122 proceeding to generate a modified update queue flag value 205 based on whether the client application 123 has access to the latest version of the first data resource that is stored on the data repository 112 and store the modified update queue flag value 205 in an appropriate location for the update queue flag value in a storage medium associated with the client device 102. In some embodiments, to determine whether the client application 123 has access to the latest version of the first data resource, the update engine 122 retrieves the latest version information 204 and/or compares the running version information 203 and the latest version information 404 to determine if the client application 123 has access to a latest version of the first data resource that is stored on the data repository 112. In response to determining that the client application 123 has access to a latest version of the first data resource that is stored in the data repository 112, the update engine 122 will not modify the initial update queue flag value 202. However, in response to determining that the client application 123 does not have access to a latest version of the first data resource that is stored on the data repository 112, the update engine 122 will generate a modified update queue flag value 205 that indicates (e.g., through indicating an update-queued status) that an update of the client application 123 is needed and stores the modified update queue flag value 205 in an appropriate location for the update queue flag value in a storage medium associated with the client device 102 (e.g., through requesting that the operating system 121 stores the modified update queue flag value 205, for example using one or more calls to an API associated with the operating system 121).

In some embodiments, as a result of process 200, the client application 123 gets launched without any updates but an update queue flag associated with the client application 123 is modified to indicate the need for an update of the client application 123. Thus, during a subsequent launch of the client application 123, the update engine 122 may cause an update of the client application 123 based on the update queue flag. Process 250 of FIG. 2B is an example of a process for such a subsequent launch.

Process 250 begins when the operating system 121 transmits an initiation command 251 for the client application 123 to the update engine 122 and the client application 123. The client application 123 proceeds to launch in response to the received initiation command 251. Moreover, in response to intercepting the initiation command 251, the update engine 122 retrieves an initial update queue flag value 252 and determines if the initial update queue flag value 252 indicates a need for an update of the client application 123. In the example process 250 of FIG. 2B, the initial update queue flag value 252 indicates the need for an update of the client application 123.

Process 250 continues with the update engine 122 proceeding to transmit a disable request 253 to the operating system 121. The disable request 253 may be a request to terminate and/or prevent launching of the client application 123 in response to the initiation command 251 received by the client application 123. For example, the disable request may be a request for transmission of a command to the client application that causes termination of a process associated with launching of the client application 123 in response to the initiation command 251 received by the client application 123, such as transmission of an onDestroy command by the Android operating system or an application(_:willFinishLaunchingWithOptions:) command by iOS.

Process 250 continues with the update engine 122 proceeding to transmit an interface request 254 to the operating system 121 which causes display of an update interface on a display device associated with the client device 102. An update interface may include a combination of user interface (UI) elements that indicate to a user of the client device 102 that the client application 123 is being updated and/or enable a user to provide user authentication of a client application 123 update. In some embodiments, an update interface may prevent usage of the client application 123 and/or of the client device 102 by any user of the client device 102 until a time associated with end of updates to the client application 123. An example update interface is presented in the prompt 910 displayed in the client device UI 900 of FIG. 9, which indicates to the user that one of the client applications running on a client device associated with the UI 900 of FIG. 9 (i.e., App1) is being updated.

In some embodiments, concurrent with display of the update interface, the update engine 122 causes the client application 123 to be in an isolated state. In some embodiments, at least one of the display of the update interface and enforcement of the isolated state occurs for the duration of the isolation period. In some embodiments, an update interface includes information about enforcement of an isolated state on the execution of the client application 123. In some embodiments, enforcement of the isolated state causes at least one of prevention of user interaction with the client application 123, prevention of user interaction with the client device 102, prevention of execution of customary operational logic of the client application 123, and execution of the update operational logic of the client application 123. In some embodiments, to cause the client application 123 to be in an isolated state, the update engine 122 modifies configurations of the client application 123, e.g., to disable customary operational logic of the client application 123 and/or enable the update operational logic of the client application 123, for example by using the PackageManger-.setComponentEnabledSetting( ) functionalities in the Android operating system.

Process 250 continues with the update engine 122 proceeding to transmit (e.g., in response to a user request with a user interface generated by the update engine 122) an update request 255 to the client application 123, which in turn causes the client application 123 to retrieve application updates 256 from the server interface 111. The server interface 111 may retrieve the application updates 256 from the data repository 112 of the server device 101. Moreover, after the end of the update, the update engine 122 generates a modified update queue flag value 257 that indicates lack of a need for an update of the client application 123. The update engine 122 may store the modified update queue flag value 257 in an appropriate location for the update queue flag value in a storage medium associated with the client device 102 (e.g., through requesting that the operating system 121 stores the modified update queue flag value 205, for example using one or more calls to an API associated with the operating system 121). In some embodiments, the update engine 122 may request that the operating system 121 transmits a command (e.g., an onCreate command in an Android operating system) to the client application 123 to re-launch the client application 123.

FIG. 3 provides a flow chart diagram of an example process 300 for launching the client application 123 on an interceptive device 102. The various steps of process 300 may be performed by the update engine 122 of an interceptive device 102 in order to handle launch of a client application 123 upon interception of an initiation command from the operating system 121 of the interceptive device 102 to the client application 123.

The process 300 begins at step 301 with obtaining an initiation command. The update engine 122 may intercept an initiation command from the operating system 121 of the interceptive device 102 to the client application 123. In some embodiments, the update engine 122 may intercept initiation commands by using intent interception functionalities, e.g., functionalities provided by the PackageManager in the Android operating system, e.g., by the PackageManger.setComponentEnabledSetting( ) method. In some embodiments, the update engine 122 may intercept initiation commands by using lifecycle activity callback methods, such as by utilizing the onActivityCreated callback method in the Application.ActivityLifecycleCallbacks interface in the API for the Android operating system.

At step 302, the update engine 122 obtains the update queue flag value and determines if the update queue flag value indicates the need for an update of the client application 123 or lack thereof (e.g., through indicating an update-queued status and an update check status respectively). If the update engine 122 determines that the update queue flag value indicates lack of a need for an update of the client application, the update engine 122 performs steps 311-312. However, if the update engine 122 determines that the update queue flag value indicates a need for an update of the client application 123, the update engine 122 performs steps 321-324.

In some embodiments, steps 321-324 are only performed by the update engine 122 when the update engine 311 determines that the update queue flag value indicates (e.g., through an update queued status) a need for an update of the client application but availability of a latest version of a data resource associated with the need for update. In some of those embodiments, if the update engine 122 determines that the update queue flag value indicates (e.g., through an update unavailable status) a need for an update of the client application but unavailability of a latest version of a data resource associated with the need for the update, the update engine 122 terminates the process 300 and optionally prevents performance of process 300 during future launches of the client application 123.

At step 311, the update engine 122 determines if an update of the client application 123 is needed in a subsequent launch of the client application 123. For example, the update engine 122 may determine if an update is needed by retrieving the latest version information for the client application 123 received from the server interface 111 and/or comparing the latest version information and the running version information received from the client application 123. As another example, the update engine 122 may determine if an update is needed by providing the latest version information received from the server interface 111 to the client application 123 and receiving a response from the client application 123 that indicates if the client application 123 has access to a latest version of a first data resource associated with the latest version information.

At step 312, the update engine 122 adjusts the update queue flag value for the client application 123 based on the determination made in step 311, i.e., the determination regarding if an update is needed in a subsequent launch of the client application 123. In some embodiments, if the update engine 122 determines that an update of the client application 123 is needed in a subsequent launch of the client application 123, the update engine 122 modifies the update queue flag value to indicate a need for an update of the client application 123. However, if the update engine 122 determines that an update is not needed in a subsequent launch of the client application 123, the update engine 122 will not modify the update queue flag value, instead leaving the update queue flag value to retain its initial update queue flag value indicating lack of a need for an update of the client application 123.

At step 321, the update engine 122 disables a launch of the client application 123 that is associated with the initiation command obtained (e.g., intercepted) in step 321. For example, the update engine 122 may request that the operating system 121 terminates a process associated with the launch of the client application 123. Furthermore, at step 322, the update engine 122 displays an update interface on a display device associated with the client device 102. In some embodiments, the update interface is configured to be visible for a duration of update of the client application 123. In some embodiments, the update interface is configured to prevent usage of the client application 123 and/or of the client device 102 by any user of the client device 102 until a time associated with end of updates to the client application 123. In some embodiments, the update interface associated with an application update contains information about properties of the application update, such as an indication of the data resources associated with the application update and/or an update progress ratio associated with the application update. In some embodiments, concurrent with display of the update interface, the update engine 122 causes the client application 123 to be in an isolated state.

At step 323, the update engine 122 causes an update of the client application 123. For example, the update engine 122 may transmit (e.g., in response to a user request with a user interface generated by the update engine 122) an indication to the client application 123 that causes the client application 123 to download data associated with an update from the server device 101, e.g., through communicating with the server interface 111 of the server device 101 that in turn retrieves data from a data repository 112 of the server device 101. Moreover, at step 324, the update engine 122 modifies the update queue flag value for the client application 123 to indicate lack of a need for an update of the client application 123. This may in turn cause the execution of steps 311-312 and/or or steps of the process 200 of FIG. 2A during a subsequent launch of the client application 123.

FIGS. 4A-4B provide data flow diagrams of example processes 400, 450 for launching the client application 123 on a client device 102 whose operating system 121 is a non-interceptive operating system (i.e., a non-interceptive device). In particular, the process 400 of FIG. 4A is an example process for launching the client application 123 on a non-interceptive device without updating the client application 123, while the process 450 of FIG. 4B is an example process for launching the client application 123 on a non-interceptive device while updating the client application 123. The process 400 of FIG. 4A may be executed by various components of the architecture 100 during a first launch of the client application 123 and/or during a first launch of the client application 123 after an update of the client application 123, while the process 450 of FIG. 4B may be executed by various components of the architecture 100 during a second launch of the client application 123 and/or during a launch of the client application that occurs after a previous launch in which the update engine 122 determines that there must be an update of the client application 123.

As depicted in FIG. 4A, the process 400 begins with transmission of an initiation command 401 from the operating system 121 to the update engine 122. The initiation command 401 may be a command from the operating system 121 that a user of the client device 102 has requested a launch of the client application 123. For example, the operating system 121 may transmit an initiation command to the update engine 122 in response to a user request to launch the client application 123, such as a user interaction with an icon associated with the client application 123 (e.g., an icon located in a user interface associated with the update engine 122). Examples of initiation commands transmitted by interceptive operating systems include the application(_:willFinishLaunchingWithOptions) command transmitted by an iOS.

Process 400 continues with the update engine 122 proceeding to, in response to intercepting the initiation command 201 for the client application 123, retrieve an initial update queue flag value 402 for the client application 123. The initial update queue flag value 402 may be a value stored in a storage medium of the client device 102 (e.g., a memory of the client device 102 and/or a permanent storage medium of the client device 102, including a permanent storage segment exclusively allocated for the client application 123, for instance using the UserDefaults functionality in the iOS operating system) that indicates if the client application 123 must update during an update associated with the retrieval of the initial update queue flag value 402. In some embodiments, the initial update queue flag value 402 is set to indicate (e.g., through indicating an update check status) a lack of a need for update of the client application 123 during a first launch of the client application 123 and/or after an update of the client application 123. In the example process 400 of FIG. 4A, the initial update queue flag value 402 indicates lack of a need for an update of the client application 123.

Process 400 continues with the update engine 122 proceeding to, in response to determining that the initial update queue flag value indicates lack of a need for an update of update of the client application 123, transmit a launch request 403 to the client application 123 configured to cause a launch of the client application 123. Moreover, the update engine 122 receives latest version information 404 for a first data resource from the server interface 111. The first data resource may be any data resource or combination of data resources that is used by the client application 123, such as a software code file that is used by a client application 123 that includes a software development environment. The server interface 111 may generate the latest version information 404 based on data stored in the data repository 112.

In some embodiments, the latest version information 404 for the first data resource may include an indication of whether the client application 123 has access to a latest version of the first data resource that is stored on the data repository 112. In some of those embodiments, to obtain the latest version information 404, the update engine 122 transmits an indication of a running version of the first data resource to the server interface 111 and obtains the latest version information 204 in response. To generate the latest version information 404, the server interface 111 may compare the indication of a running version of a first data resource available to the client application 123 to an indication of a latest version of the first data resource that is stored on the data repository 112 (i.e., a latest version of the first data resource). For example, the indication of the running version of the first data resource obtained by the server interface 111 may be a first numeric property (e.g., a numeric identifier, a timestamp, etc.) associated with the running version of the first data resource, and the server interface 111 may compare the first numeric property for the running version of the first data resource to a corresponding first numeric property for the latest version of the first data resource. As another example, the indication of the running version of the first data resource obtained by the server interface 111 may be a first text-string property (e.g., all or part of the content data) associated with the running version of the first data resource, and the server interface 111 may compare the first text-string property for the running version of the first data resource to a corresponding first text-string property for the latest version of the first data resource.

In some embodiments, the latest version information 404 for the first data resource may be an indication of a latest version of the first data resource that is stored on the data repository 112 of the server device 101. For example, the latest version information 404 for the first data resource may be an identifier (e.g., a timestamp) of a latest version of the first data resource (e.g., a code resource) that is stored on the data repository 112. As another example, the latest version information 404 for the first data resource may be a value determined by hashing some or all parts of a latest version of the first data resource that is stored on the data repository 112. The server interface 111 may generate the latest version information 404 based on data stored in the data repository 112. In some embodiments, the update engine 122 uses the latest version information 404 to determine if the client application 123 has access to a latest version of the first data resource indicated by the latest version information 404 received from the server interface 111.

Process 400 continues with the update engine 122 proceeding to generate a modified update queue flag value 405 based on whether the client application 123 has access to a latest version of the first data resource that is stored on the data repository 112 and store the modified update queue flag value 205 in an appropriate location for the update queue flag value in a storage medium associated with the client device 102. In some embodiments, in response to determining that the client application 123 has access to a latest version of the first data resource that is stored in the data repository 112, the update engine 122 will not modify the initial update queue flag value 202. However, in response to determining that the client application 123 does not have access to a latest version of the first data resource that is stored on the data repository 112, the update engine 122 will generate a modified update queue flag value 405 that indicates (e.g., by indicating an update-queued status) that an update of the client application 123 is needed and stores the modified update queue flag value 205 in an appropriate location for the update queue flag value in a storage medium associated with the client device 102.

In some embodiments, as a result of process 400, the client application 123 gets launched without any updates but an update queue flag associated with the client application 123 is modified to indicate the need for an update of the client application 123. Thus, during a subsequent launch of the client application 123, the update engine 122 may cause an update of the client application 123 based on the update queue flag. Process 450 of FIG. 4B is an example of a process for such a subsequent launch.

Process 450 begins when the operating system 121 transmits an initiation command 451 for the client application 123 to the update engine 122. In response to intercepting the initiation command 451, the update engine 122 retrieves an initial update queue flag value 452 and determines if the initial update queue flag value 452 indicates a need for an update of the client application 123. In the example process 250 of FIG. 2B, the initial update queue flag value 452 indicates the need for an update of the client application 123.

Process 450 continues with the update engine 122 proceeding to transmit an interface request 454 to the operating system 121 which causes display of an update interface on a display device associated with the client device 102. An update interface is a combination of user interface (UI) elements that indicate to a user of the client device 102 that the client application 123 is being updated. In some embodiments, an update interface may prevent usage of the client application 123 and/or of the client device 102 by any user of the client device 102 until a time associated with end of updates to the client application 123. An example update interface is presented in the prompt 910 displayed in the client device UI 900 of FIG. 9, which indicates to the user that one of the client applications running on a client device associated with the UI 900 of FIG. 9 (i.e., App1) is being updated.

In some embodiments, concurrent with display of the update interface, the update engine 122 causes the client application 123 to be in an isolated state. In some embodiments, at least one of the display of the update interface and enforcement of the isolated state occurs for the duration of the isolation period. In some embodiments, an update interface includes information about enforcement of an isolated state on the execution of the client application 123. In some embodiments, enforcement of the isolated state causes at least one of prevention of user interaction with the client application 123, prevention of user interaction with the client device 102, prevention of execution of customary operational logic of the client application 123, and execution of the update operational logic of the client application 123. In some embodiments, to cause the client application 123 to be in an isolated state, the update engine 122 refuses to forward qualified lifecycle commands to the client application 123 during the isolation period.

Process 450 continues with the update engine 122 proceeding to transmit (e.g., in response to a user request with a user interface generated by the update engine 122) an update request 454 to the client application 123, which in turn causes the client application 123 to download application updates 455 from the server interface 111. The server interface 111 may retrieve the application updates 455 from the data repository 112 of the server device 101. Furthermore, after the end of the update, the update engine 122 transmits a launch request 456 to the client application 123 configured to cause the client application 123 to launch (e.g., by forwarding the initiation command 451 to the client application). Moreover, after the end of the update, the update engine 122 generates a modified update queue flag value 457 that indicates lack of a need for an update of the client application 123. The update engine 122 may store the modified update queue flag value 457 in an appropriate location for the update queue flag value in a storage medium associated with the client device 102.

FIG. 5 provides a flow chart diagram of an example process 500 for launching the client application 123 on a non-interceptive device 102. The various steps of process 500 may be performed by the update engine 122 of a non-interceptive device 102 in order to handle launch of a client application 123 upon interception of an initiation command from the operating system 121 of the interceptive device 102 to the client application 123.

The process 500 begins at step 501 with obtaining an initiation command. The update engine 122 may be configured to receive qualified lifecycle commands associated with the client application 123. For example, the update engine 122 may be configured to receive initiation commands (e.g., iOS application(_:willFinishLaunchingWithOptions:) commands) that have a tag associated with the client application 123. In some embodiments, the update engine 122 may be configured to intercept initiation commands by changing configuration of the client device 102 so that the update engine 122 (and not the client application 123 itself) receives some or all operating system 122 commands (e.g., including all lifecycle commands) for the client application 123, e.g., by defining the update engine 122 as a primary UIApplicationDelegate to which some or all operating system 122 commands for the client application 123 in the iOS operating system are sent and/or by defining the software application 123 as a secondary UIApplicationDelegate.in the iOS operating system). In some embodiments, the update engine 122 may be configured to possess mobile device management (MDM) capabilities and utilize those MDM capabilities to obtain the initiation command.

At step 502, the update engine 122 obtains the update queue flag value and determines if the update queue flag value indicates the need for an update of the client application 123 or lack thereof. If the update engine 122 determines that the update queue flag value indicates lack of a need for an update of the client application, the update engine 122 performs steps 511-513. However, if the update engine 122 determines that the update queue flag value indicates a need for an update of the client application 123, the update engine 122 performs steps 521-524.

In some embodiments, steps 521-524 are only performed by the update engine 122 when the update engine 311 determines that the update queue flag value indicates (e.g., through an update queued status) a need for an update of the client application but availability of a latest version of a data resource associated with the need for update. In some of those embodiments, if the update engine 122 determines that the update queue flag value indicates (e.g., through an update unavailable status) a need for an update of the client application but unavailability of a latest version of a data resource associated with the need for the update, the update engine 122 terminates the process 500 and optionally prevents performance of process 500 during future launches of the client application 123.

At step 511, the update engine 122 launches the client application 123. Moreover, at step 512, the update engine 122 determines if an update of the client application 123 is needed in a subsequent launch of the client application 123. For example, the update engine 122 may determine if an update is needed by retrieving the latest version information for the client application 123 received from the server interface 111 and/or comparing the latest version information received from the server interface 111 and the running version information received from the client application 123. As another example, the update engine 122 may determine if an update is needed by providing the latest version information received from the server interface 111 to the client application 123 and receiving a response from the client application 123 that indicates if the client application 123 has access to a latest version of a first data resource associated with the latest version information.

At step 513, the update engine 122 adjusts the update queue flag value for the client application 123 based on the determination made in step 512, i.e., the determination regarding if an update of the client application 123 is needed in a subsequent launch of the client application 123. In some embodiments, if the update engine 122 determines that an update is needed in a subsequent launch of the client application 123, the update engine 122 modifies the update queue flag value to indicate a need for an update of the client application 123. However, if the update engine 122 determines that an update is not needed in a subsequent launch of the client application 123, the update engine 122 will not modify the update queue flag value, instead leaving the update queue flag value to retain its initial update queue flag value indicating lack of a need for an update of the client application 123.

At step 521, the update engine 122 displays an update interface on a display device associated with the client device 102. In some embodiments, the update interface is configured to be visible for a duration of update of the client application 123. In some embodiments, the update interface is configured to prevent usage of the client application 123 and/or of the client device 102 by any user of the client device 102 until a time associated with end of updates to the client application 123. In some embodiments, the update interface associated with an application update contains information about properties of the application update, such as an indication of the data resources associated with the application update and/or an update progress ratio associated with the application update.

At step 522, the update engine 122 causes an update of the client application 123. For example, the update engine 122 may transmit (e.g., in response to a user request with a user interface generated by the update engine 122) an indication to the client application 123 that causes the client application 123 to download data associated with an update from the server device 101, e.g., through communicating with the server interface 111 of the server device 101 that in turn retrieves data from a data repository 112 of the server device 101. Furthermore, at step 523, the update engine 122 modifies the update queue flag value for the client application 123 to indicate lack of a need for an update of the client application 123. This may in turn cause the execution of steps 511-513 and/or or steps of the process 400 of FIG. 2A during a subsequent launch of the client application 123. Moreover, at step 524, the update engine 122 causes launch of the client application 123, e.g., by forwarding the initiation command obtained in step 501 to the client application 123.

Operating System Command Filtering

In some embodiments, an update engine 122 in a client device 102 that is non-interceptive may be configured to receive various operating system 121 commands for the client application 123 in addition to update-related commands, i.e., commands (e.g., qualified lifecycle-based commands) transmitted by the operating system 121 to the client application 123 that may require an update of the client application. For example, the update engine 122 in a non-interceptive device may be configured to receive all of the commands for the client application 123. This may be because a non-interceptive operating system characterizing a non-interceptive device may fail to enable selective interception of particular operating system 121 commands for a client application 123 by a different application, such as the update engine 122. Thus, to allow effective update management for the client application 123, the update engine 122 may be configured to filter operating system 121 commands for the client application 123 in order to provide a differential treatment of update-related commands and non-update-related commands.

FIG. 6 provides a flowchart diagram of an example process 600 for filtering commands transmitted by a non-interceptive operating system 121 for the client application 123. The process 600 may be performed by the update engine 122 for enabling differential treatment of update-related commands and non-update-related commands transmitted by the non-interceptive operating system 121.

The process 600 begins at step 601 with obtaining an operating system 121 command for a client application 123. For example, the update engine 122 may receive the command from the operating system 121. The update engine 122 may analyze the command to determine (e.g., based on one or more tag values and/or flag values associated with the command) that the command pertains to the client application 123. Furthermore, at step 602, the update engine 122 determines if the command obtained in step 601 is an update-related command. An update-related command is a command from the operating system 121 for the client application 123 that is deemed to necessitate an update of the client application 123.

In some embodiments, step 601 may be performed by performing various steps of FIG. 7, which depicts a flowchart diagram of an example process 700 for determining if a command is an update-related command. The process 700, which may be performed by the update engine 122, begins at step 701 by determining if a command is a known command, i.e., a command having a type that is known to the update engine 122 based on data defining known command types associated with the operating system 121. For example, the update engine 122 may determine that a command is not a known command if the type of command is not known to the update engine 122 based on data defining known command types associated with the operating system 121. This may happen when a command is added to the logic of the operating system 121 as a result of a recent operating system 121 update that occurred after the latest update to the data defining known command types associated with the operating system 121.

At step 711, responsive to a determination that the command is unknown, the update engine 122 determines that the command is not update-related. Thus, in some embodiments, the update engine 122 assumes that an unknown command is not update-related. Moreover, at step 721, responsive to a determination that the command is unknown, the update engine 122 determines if the known command is deemed update-related. In some embodiments, the update engine 122 may determine if a known command is deemed update-related based on data defining known update-related command types associated with the operating system 121. For example, the data defining known update-related command types associated with the operating system 121 may indicate that an initiation command type is deemed to be update-related.

Returning to FIG. 6, at step 611, responsive to a determination that the command is not update-related, the update engine 122 provides (e.g., forwards and/or transmits without modification) the command to the client application 123. FIG. 8 provides an operational example 800 of forwarding four non-update-related commands to the client application 123. In particular, as depicted in the operational example 800, the update engine 122 receives four non-update-related commands from the operating commands and forwards those four commands to the client application 123. The four commands include three known commands (i.e., an applicationDidBecomeActive command 801, an applicationDidEnterBackground command 802, and an applicationDidEnterForeground command 803), as well as an unknown command 804. Moreover, at step 621, responsive to a determination that the command is update-related, the update engine 122 handles commands based on whether there is a need for an update of the client application 123. For example, the update engine 122 may handle the commands based on at least one of the processes 400, 450, and 500 described with reference to FIGS. 4A, 4B, and 5 respectively.

Coordinated Multi-Application Update Management

In some embodiments, the update engine 122 may handle updates for more than one client applications 123 executing on the client device 102, where some of those client applications 123 utilize shared resource. In those instances, if the update engine 122 determines that a first application does not have access to the latest version of a shared resource, the update engine 122 may proceed to modify update queue flags for any client application that uses the shared resource. Moreover, in some embodiments, if a first application downloads an update to a shared resource on the client device 102, the update engine 122 may adjust the update queue flags of any client applications that utilizes the shared resource based on the availability of the latest version of the shared resource on the client device 102. For example, in some embodiments, upon download of a shared resource by a first application, the update engine 122 will modify the update queue flag of any client application that utilizes the shared resource to indicate lack of a need for an update of the respective client applications.

FIGS. 10A-10B provide data flow diagrams of example processes 1000 and 1050 for coordinated multi-application update management. The processes 1000 and 1050 may be performed by various components of the architecture 100. Although processes 1000 and 1050 relate to coordinated multi-application update management in interceptive devices having interceptive operating systems, one of ordinary skill in the art will recognize that the same techniques could be applied to non-interceptive devices having non-interceptive operating systems without departing from the spirit of the invention.

The process 1000 relates to launching a client application A 123A when the initial update queue flag value 1002 for the client application A 123A indicates lack of a need for updating the client application A 123A. The process 1000 begins with the operating system 121 transmitting an initiation command 1001 for the client application A 123A to the client application A 123A and the update engine 122. In response to receiving the initiation command 1001, the client application A 123A launches. Moreover, in response to intercepting the initiation command 1001, the update engine 122 retrieves the value of the initial update queue flag value 1002 and determines that the value indicates lack of a need for updating the client application A 123A.

The process 100 continues with the update engine 122 proceeding to obtain latest version information 1003 from the server interface 111 and the running version information 1004 from the client application A 123A. The update engine 122 uses the latest version information 1003 and the running version information 1004 to determine if the client application A 123A has access to the latest version of a resource shared between the client application A 123A and a client application B 123B. If the update engine 122 determines that the client application A 123A does not have access to the latest version of the shared resource, the update engine 122 generates and stores a modified update queue flag value 1005 for the client application A 123A and a modified update queue flag value 1006 for the client application B 123B, where each modified update queue flag value indicates that the corresponding client application needs software application updates during a launch associated with retrieval of the modified update queue flag value.

The process 1050 relates to launching the client application B 123B when the initial update queue flag value 1052 for the client application B 123B indicates a need for updating the client application B 123B. In some embodiments, the process 1050 may occur during a launch after the launch associated with process 1000 of FIG. 10A and as a result of modifications to update queue flags described in reference to elements 1005 and 1006 of FIG. 10A.

The process 1050 begins with the operating system 121 transmitting an initiation command 1051 for the client application B 123B to the client application B 123B and the update engine 122. In response to receiving the initiation command 1001, the client application B 123B launches. Moreover, in response to intercepting the initiation command 1051, the update engine 122 retrieves the value of the initial update queue flag value 1052 and determines that the value indicates a need for updating the client application B 123B.

The process 1050 continues with the update engine 122 proceeding to transmit a disable request 1053 to the operating system 121 to terminate the process associated with the launch of client application B. The update engine 122 also transmits an interface request 1054 to the operating system 121 to display an update request. Furthermore, the update engine 122 transmits an update request 1055 to the client application B 123B, which in turn causes the client application B 123B to download application updates 1056 from the server interface 111. In some embodiments, the client application B 123B stores the application updates 1056 and/or the updated version of the shared resource in a storage medium accessible to both the client application A 123A and the client application B 123B. Moreover, the update engine 122 generates and stores a modified update queue flag value 1057 for the client application A 123A and a modified update queue flag value 1058 for the client application B 123B, where each modified update queue flag value indicates that the corresponding client application does not need software application updates during a launch associated with retrieval of the modified update queue flag value.

Additional Implementation Details

Although example processing systems have been described in FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated command, e.g., a machine-generated electrical, optical, or electromagnetic command, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated command, a computer-readable storage medium can be a source or destination of computer program instructions encoded in an artificially-generated propagated command. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Conclusion

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. An apparatus for software application update management for a first software application executing on a computing device with an operating system software application and an update engine, the apparatus comprising at least one processor and at least one non-transitory memory comprising program code, wherein the at least one non-transitory memory and the program code are configured to, with the at least one processor, cause the apparatus to at least:
   receive, by the update engine and from the operating system software application, a first qualified lifecycle command associated with the first software application;
   in response to receiving the first qualified lifecycle command from the operating system software application, obtain, by the update engine, a first update queue flag value associated with the first software application;
   determine, by the update engine, if the first update queue flag value indicates an update-queued status for the first software application or an update check status for the first software application; and
   in response to determining that the first update queue flag value indicates the update check status for the first software application, perform, by the update engine, a first set of update engine operations comprising:
      determining if the first software application has access to a first latest version of a first data resource associated with the first software application; and
      adjusting the first update queue flag value based on if the first software application has access to the first latest version, wherein adjusting the first update queue flag value comprises:
         in response to determining that the first software application does not have access to the first latest version, modifying the first update queue flag value to indicate the update-queued status for the first software application, and
         in response to determining that the first software application has access to the first latest version, maintaining the first update queue flag value to indicate the update check status for the first software application.

2. A non-transitory computer storage medium for software application update management for a first software application executing on a computing device with an operating system software application and an update engine, the non-transitory computer storage medium comprising instructions configured to cause one or more processors to at least:
   receive, by the update engine and from the operating system software application, a first qualified lifecycle command associated with the first software application;
   in response to receiving the first qualified lifecycle command from the operating system software application, obtain, by the update engine, a first update queue flag value associated with the first software application;
   determine, by the update engine, if the first update queue flag value indicates an update-queued status for the first software application or an update check status for the first software application; and
   in response to determining that the first update queue flag value indicates the update check status for the first software application, performing, by the update engine, a first set of update engine operations comprising:
      determining if the first software application has access to a first latest version of a first data resource associated with the first software application; and
      adjusting the first update queue flag value based on if the first software application has access to the first latest version, wherein adjusting the first update queue flag value comprises:
         in response to determining that the first software application does not have access to the first latest version, modifying the first update queue flag value to indicate the update-queued status for the first software application, and in response to determining that the first software application has access to the first latest version, maintaining the first update queue flag value to indicate the update check status for the first software application.

3. The apparatus of claim 1, wherein the operating system software application is non-interceptive and the first set of update engine operations further comprise:

transmitting the first qualified lifecycle command to the first software application.

4. The apparatus of claim 1, wherein the at least one non-transitory memory and the program code are further configured to, with the at least one processor, cause the apparatus to at least:

in response to determining that the first update queue flag value indicates the update-queued status, perform, by the update engine, a second set of update engine operations comprising:

cause the first software application to execute in an isolated state for an isolation period;

cause display of an update interface during the isolation period;

cause the first software application to retrieve the first latest version; and modify the first update queue flag value to indicate the update check status.

5. The apparatus of claim 4, wherein the isolation period includes a first period between a first time of determining that the first update queue flag value indicates the update-queued status and a second time of determining successful execution of at least one of retrieval of the first latest version by the first software application and modification of the first update queue flag value to indicate the update check status.

6. The apparatus of claim 4, wherein causing the first software application to execute in the isolated state comprises preventing interaction by a user of the computing device with the first software application.

7. The apparatus of claim 4, wherein:

causing the first software application to execute in the isolated state comprises causing execution of an update operational logic associated with the first software application and preventing execution of a customary operational logic associated with the first software application;

the update operational logic comprises a first set of software application operations configured to cause the first software application to retrieve the first latest version from a server system;

the customary operational logic comprises a second set of software application operations configured to be performed by the first software application in response to receiving the first qualified lifecycle command when the first software application is not executing in the isolated state; and the first set of software application operations do not include the second set of software application operations.

8. The apparatus of claim 4, wherein the operating system software application is non-interceptive and the second set of update engine operations further comprise:

detecting end of the isolation period; and in response to detecting end of the isolation period, transmitting the first qualified lifecycle command to the first software application.

9. The apparatus of claim 4, wherein the operating system software application is interceptive and the second set of update engine operations further comprise:

transmitting a first request to the operating system software application to terminate a first qualified lifecycle event of the first software application, wherein the first qualified lifecycle event is configured to occur in response to the first qualified lifecycle command.

10. The apparatus of claim 4, wherein the second set of update engine operations further comprise:

identifying one or more second software applications executing on the computing device that each utilize the first data resource;

for each second software application of the one or more second software applications, identifying a second update queue flag; and modifying the second update queue flag associated with the second software application of the one or more second software applications to indicate the update check status.

11. The apparatus of claim 1, wherein the first set of update engine operations further comprise:

identifying one or more third software applications executing on the computing device that each utilize the first data resource;

for each third software application of the one or more third software applications, identifying a third update queue flag;

adjusting the third update queue flag associated with the third software application of the one or more third software applications based on if the first software application has access to the first latest version.

12. The apparatus of claim 1, wherein the operating system software application is non-interceptive and the program code is further configured to cause one or more processors to at least:

receive, by the update engine and from the operating system software application, a second command associated with the first software application;

identify, by the update engine, one or more qualified lifecycle command types, wherein the one or more qualified lifecycle command types include a first command type of the first qualified lifecycle command and wherein each command whose respective command type conforms to at least one qualified lifecycle command type of the one or more qualified lifecycle command types is configured to initiate an update processing routine;

identify, by the update engine, a second command type for the second command;

determine, by the update engine, if the second command type conforms to at least one qualified lifecycle command types of the one or more qualified lifecycle command types;

in response to determining that the second command type does not conform to the at least one qualified lifecycle command types of the one or more qualified lifecycle command types, transmit, by the update engine, the second command to the first software application.

13. The apparatus of claim 1, wherein the first qualified lifecycle command is a first initiation command.

14. The apparatus of claim 1, wherein determining if the first software application has access to the first latest version comprises:

identifying a first running version of the first data resource, wherein the first running version of the first data resource is a version of the first data resource available to the first software application; and determining if the first software application has access to the first latest version by comparing the first latest version and the first running version.

15. The apparatus of claim 1, wherein determining if the first software application has access to the first latest version comprises:

transmitting a second request to the first software application to indicate if the first software application has access to the first latest version, wherein the second request includes a first indication of the first latest version; and receiving a response to the second request from the first software application, wherein the response indicates if the first software application has access to the first latest version.

16. The apparatus of claim 1, wherein identifying the first latest version includes receiving a second indication of the first latest version from a server device.

17. The apparatus of claim 1, wherein the first data resource is a software code file.

18. The apparatus of claim 1, wherein determining if the first software application has access to the first latest version of the first data resource associated with the first software application comprises obtaining latest version information for the first data resource from an update server.

19. The non-transitory computer storage medium of claim 2, wherein the operating system software application is non-interceptive and the first set of update engine operations further comprise:

transmitting the first qualified lifecycle command to the first software application.

20. A computer-implemented method for software application update management for a first software application executing on a computing device with an operating system software application and an update engine, the computer-implemented method comprising:

receiving, by the update engine and from the operating system software application, a first qualified lifecycle command associated with the first software application;

in response to receiving the first qualified lifecycle command from the operating system software application, obtaining, by the update engine, a first update queue flag value associated with the first software application;

determining, by the update engine, if the first update queue flag value indicates an update-queued status for the first software application or an update check status for the first software application; and in response to determining that the first update queue flag value indicates the update check status for the first software application, performing, by the update engine, a first set of update engine operations comprising:

determining if the first software application has access to a first latest version of a first data resource associated with the first software application; and adjusting the first update queue flag value based on if the first software application has access to the first latest version, wherein adjusting the first update queue flag value comprises:

in response to determining that the first software application does not have access to the first latest version, modifying the first update queue flag value to indicate the update-queued status for the first software application, and in response to determining that the first software application has access to the first latest version, maintaining the first update queue flag value to indicate the update check status for the first software application.

\* \* \* \* \*